United States Patent
Hata

(10) Patent No.: US 9,804,944 B2
(45) Date of Patent: Oct. 31, 2017

(54) DATA PROCESSING SYSTEM

(71) Applicant: Renesas Electronics Corporation, Kawasaki-shi (JP)

(72) Inventor: Hisashi Hata, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 116 days.

(21) Appl. No.: 14/452,344

(22) Filed: Aug. 5, 2014

(65) Prior Publication Data

US 2015/0046742 A1  Feb. 12, 2015

(30) Foreign Application Priority Data

Aug. 9, 2013 (JP) .................................. 2013-166536

(51) Int. Cl.
  *G06F 1/14* (2006.01)
  *G06F 11/36* (2006.01)

(52) U.S. Cl.
  CPC ............ *G06F 11/3604* (2013.01); *G06F 1/14* (2013.01)

(58) Field of Classification Search
  CPC ........................................................ G06F 1/12
  See application file for complete search history.

(56) References Cited

U.S. PATENT DOCUMENTS

| 5,748,878 A | 5/1998 | Rees et al. | |
| 7,594,146 B2 | 9/2009 | Horikawa et al. | |
| 7,613,212 B1* | 11/2009 | Raz .................. | H04J 3/0641 370/510 |
| 2009/0147806 A1* | 6/2009 | Brueckheimer ...... | H04J 3/0667 370/503 |

(Continued)

FOREIGN PATENT DOCUMENTS

| JP | 9-218800 A | 8/1997 |
| JP | 2005-235054 A | 9/2005 |
| JP | 2007-026048 A | 2/2007 |

(Continued)

OTHER PUBLICATIONS

Japanese Office Action dated May 23, 2017, with an English translation.

(Continued)

*Primary Examiner* — Kim Huynh
*Assistant Examiner* — Eric Chang
(74) *Attorney, Agent, or Firm* — McGinn IP Law Group, PLLC

(57) ABSTRACT

Disclosed is a data processing system that permits the analysis of software in the entire data processing system even when it is configured so that a plurality of control modules is dispersively installed at remote places. In the data processing system formed of the control modules, the control modules each include a timer that counts time common to the entire data processing system, and a time synchronization process is employed to synchronize time (Continued)

information derived from the timer in a low-level control module with time information derived from the timer in a high-level control module. The data processing system incorporates a log acquisition function that not only acquires a log but also adds a timestamp based on timer time to the acquired log during, for example, an application process.

18 Claims, 21 Drawing Sheets

(56) References Cited

U.S. PATENT DOCUMENTS

| | | | | |
|---|---|---|---|---|
| 2011/0006818 A1* | 1/2011 | Takagi | ............... | H03L 7/085 |
| | | | | 327/147 |
| 2011/0019698 A1* | 1/2011 | Akae | ............... | H04J 3/0664 |
| | | | | 370/509 |

FOREIGN PATENT DOCUMENTS

| | | |
|---|---|---|
| JP | 2009-289131 A | 12/2009 |
| JP | 2010-204934 A | 9/2010 |
| JP | 2011-186806 A | 9/2011 |
| JP | 2012-190197 A | 10/2012 |
| JP | 2012-216040 A | 11/2012 |

OTHER PUBLICATIONS

Japanese Office Action dated Dec. 15, 2016, with an English translation.

Hiyama, et al., "Implementation of Precision Clock Synchronization Protocol to IEEE802.11", IEICE Technical Report IA2009-82-IA2009-95 Internet Architecture, The Institute of Electronics, Information and Communication Engineers, Feb. 12, 2010, vol. 109, No. 421, pp. 23-28.

* cited by examiner

FIG. 13

TAG TABLE 105

| TAG NUMBER | TAG VALUE | CONVERTED VALUE |
|---|---|---|
| 1 | 0 | IF_B TRANSMISSION |
| 1 | 1 | IF_B RECEPTION |
| 2 | 0 | EVENT A |
| 2 | 1 | EVENT B |
| 3 | 0 | IF_A TRANSMISSION |
| 3 | 1 | IF_A RECEPTION |

FIG. 15

SYSTEM LOG 303

| NET ID | TAG NUMBER | TAG VALUE | TIME-STAMP | CONVERTED VALUE |
|---|---|---|---|---|
| 1 | 1 | 0 | 1ms | IF_B TRANSMISSION |
| 2 | 1 | 1 | 2ms | IF_B RECEPTION |
| 2 | 3 | 0 | 3ms | IF_A TRANSMISSION |
| 3 | 3 | 1 | 4ms | IF_A RECEPTION |
| 3 | 2 | 0 | 5ms | EVENT A |
| 3 | 3 | 0 | 6ms | IF_A TRANSMISSION |
| 2 | 3 | 1 | 7ms | IF_A TRANSMISSION |
| 2 | 1 | 0 | 8ms | IF_B TRANSMISSION |
| 1 | 1 | 1 | 9ms | IF_B RECEPTION |

DATA PROCESSING SYSTEM

CROSS-REFERENCE TO RELATED APPLICATIONS

The disclosure of Japanese Patent Application No. 2013-166536 filed on Aug. 9, 2013 including the specification, drawings, and abstract is incorporated herein by reference in its entirety.

BACKGROUND

The present invention relates to a data processing system that makes it possible to perform a comprehensive evaluation of cooperative data processing performed by a plurality of control modules coupled through a communication path. More specifically, the present invention relates to an effective technology applicable, for instance, to an in-vehicle electronic control system in which a plurality of electronic control units (ECUs) is coupled to an in-vehicle network.

Electronic devices are increasingly used, for instance, in automobiles to increase the total number of control modules. This results in an increase in the number of man-hours required for developing an embedded system. Hence, a software development process is now being reviewed. A process of verifying an actual embedded system that is performed during a currently employed embedded system development process is mainly based on simulation. Systems proposed in Japanese Unexamined Patent Publications No. 2010-204934, No. Hei 09 (1997)-218800, and No. 2012-190197 are configured to improve the above situation.

The systems proposed in Japanese Unexamined Patent Publications No. 2010-204934 and No. Hei 09 (1997)-218800 are configured to analyze software for a processor having a data bus and an address bus. The systems insert a tag statement in an arbitrary place in the software in order to output tag information to a predetermined address within an address space. Next, the systems couple a debugging device to an external output bus of the processor in order to monitor the bus access of the processor. When the software is executed to output the tag information, the debugging device identifies the tag information in accordance with information derived from bus monitoring, acquires the tag information, and records the tag information and time. The recorded tag information and time are transferred to a calculation section and analytically processed to analyze the software.

The system proposed in Japanese Unexamined Patent Publication No. 2012-190197 is configured to analyze software that runs in a plurality of processors. The system includes an image processing device, which is to be observed, and an external device, which provides log analysis. The image processing device includes one main CPU and one or more sub-CPUs. The main CPU issues a command to the sub-CPUs and records the time of command issuance. The sub-CPUs record the time of command execution. The external device collects the logs of the main CPU and sub-CPUs, and analyzes the operating status of the main CPU and sub-CPUs in accordance with the time of command issuance and the time of command execution.

SUMMARY

The inventors of the present invention make a new proposal on a development process from the viewpoint of hardware. In a situation where software is evaluated with an actual product based on related art, it is found that the number of CPUs simultaneously available for analysis is limited and that the configuration of a network is also limited.

For example, a situation where a plurality of modules is coupled is not assumed in Japanese Unexamined Patent Publications No. 2010-204934 and No. Hei 09 (1997)-218800. Even if the modules are coupled, the number of them is limited due to the physical use of ports of the debugging device. Even if there is no problem with the number of ports, the length of wiring to the debugging device increases with an increase in the distance between the modules. This makes it difficult to couple the modules.

The system proposed in Japanese Unexamined Patent Publication No. 2012-190197 acquires time while regarding the time of command issuance from the main CPU as a start point. Therefore, the system is only applicable to a star configuration in which the sub-CPUs are coupled to the main CPU, and not applicable to a daisy-chain configuration in which a sub-sub-CPU is coupled to a sub-CPU. If the main CPU and the sub-CPUs use different clock oscillators, timer value consistency is impaired due to a frequency error. Hence, the sub-CPUs cannot be arranged physically apart from the main CPU. In addition, a method of correcting such timer value inconsistency is not described in Japanese Unexamined Patent Publication No. 2012-190197.

The above and other problems to be addressed and novel features of the present invention will become apparent from the following description of the present invention and from the accompanying drawings.

The following is a brief description of a representative aspect of the present invention disclosed in this document.

According to the representative aspect of the present invention, there is provided a data processing system including a plurality of control modules. Each control module includes a timer that counts time common to the entire data processing system. A time synchronization process is employed so that time information derived from the timer in a low-level control module is synchronized with time information derived from the timer in a high-level control module. A log acquisition function is incorporated so that when, for instance, a log is acquired during an application process, a timestamp based on timer time is added to the acquired log. When logs output from the control modules are collected and merged, software running in the entire system can be analyzed.

The following is a brief description of an advantageous effect achievable by the representative aspect of the present invention disclosed in this document.

Even when an employed system is configured so that a plurality of control modules is dispersively installed at remote places, software in the entire system can be analyzed.

BRIEF DESCRIPTION OF THE DRAWINGS

FIG. 13 is a diagram illustrating the configuration of a tag table;

FIG. 15 is a diagram illustrating a system log;

DETAILED DESCRIPTION

1. Overview of Embodiments

Figure 1:
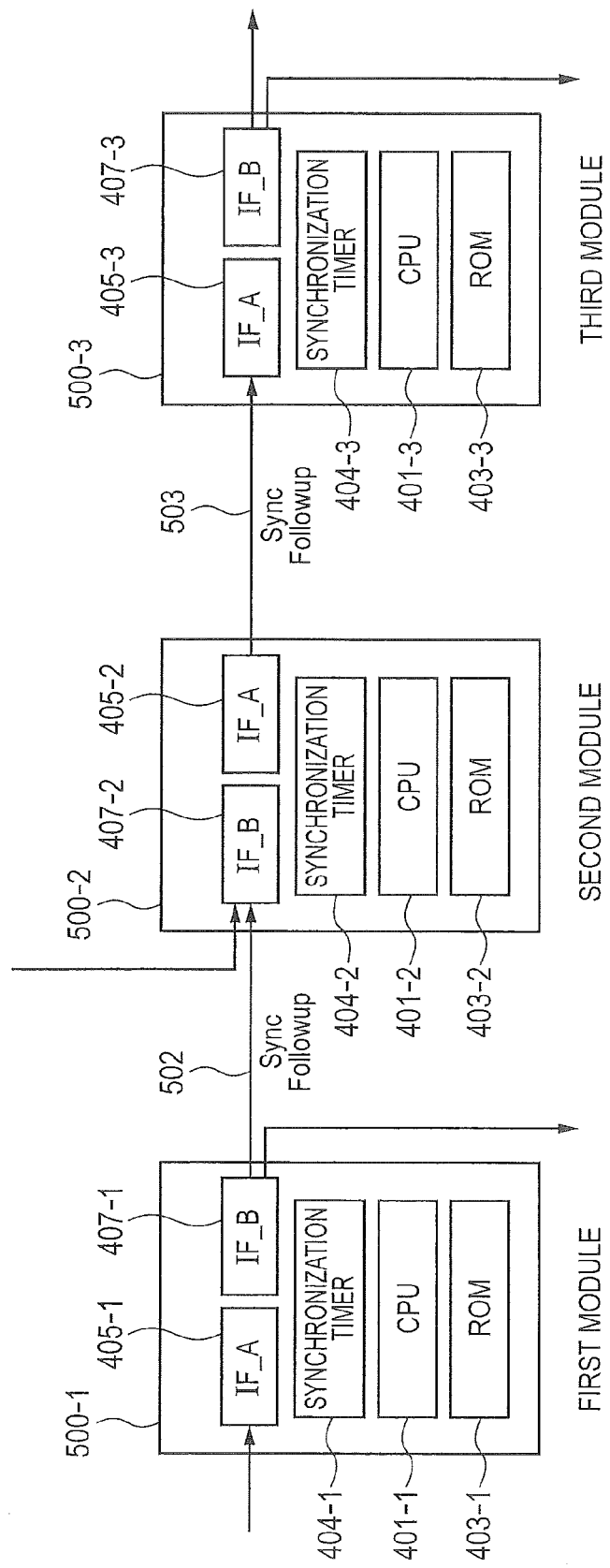
FIG. 1 is a block diagram illustrating a basic configuration of a data processing system.

First of all, embodiments of the present invention disclosed in this document will be summarized. The parenthesized reference numerals in the accompanying drawings referred to in the overview of the embodiments merely illustrate what is contained in the concept of elements to which the reference numerals are affixed.

[1] <Timer-based Time Synchronization Process between Control Modules>

A data processing system (201) includes a plurality of control modules (500-1, 500-2, 500-3) capable of communicating with each other. The control modules in the data processing system each include communication interfaces (405, 407) and a timer (404), and perform a required application process, a unit log generation process, and a time synchronization process in accordance with a program executed by the control modules. The time synchronization process is performed by the timer for time synchronization purposes. At a test point designated by a program executed in the unit log generation process, the unit log generation process generates timestamps in accordance with log information and with time information derived from the timer, and accumulates the timestamps together with attribute information about the test point to generate a unit log. The time synchronization process synchronizes the time information derived from the timer in a low-level control module with the time information derived from the timer in a high-level control module.

Even if the control modules are dispersively installed at remote places, the above-described process ensures that times indicated by timestamps on unit logs generated by the control modules can be synchronized on the same time axis. Therefore, when the unit logs generated by the individual control modules are merged by using each timestamp as an index, a system log of the entire data processing system can be obtained with ease.

[2] <Correction Made in Accordance with Timer Time Difference Between High- and Low-level Control Modules>

Referring to section [1], in the time synchronization process, the low-level control module receives information (T1, T5) about the timer time of the high-level control module from the high-level control module and corrects its local timer time in accordance with the received information about the time and with the information about its local timer time (T2, T6) and other information (T3, T4, T7, T8) prevailing when the information about the time is received.

The above-described process permits the timer time of the low-level control module to be synchronized with the timer time of the high-level control module. Therefore, the number of control modules subjected to time synchronization and the form of a network are not theoretically limited.

[3] <Correcting Timer Time by Rewriting Timer Time>

Referring to section [2], the process of correcting the local timer time is a process of rewriting the local timer time.

The above-described process ensures that the time derived from the timer can be directly used as a timestamp as far as a timer error is corrected.

[4] <Correcting Timer Time by Correcting Time Information Derived from Timer>

Referring to section [2], the process of correcting the local timer time is a process of correcting time information derived from the local timer at the time of timestamp generation.

The above-described process eliminates the necessity of rewriting or presetting the timer time. However, the time derived from the timer needs to be corrected before being used as a timestamp.

[5] <Acquiring Communication Delay to Compute Timer Time Error>

Referring to section [2], a communication delay (Tdelay) in a communication from the high-level control module to the low-level control module is acquired, then a timer time error (Tdiff, Tcd) is computed by subtracting the communication delay from the difference between actual transmission time and reception time, and the computed timer time error is used to correct the timer time.

The above makes it possible to correct the timer time with ease in consideration of a communication delay.

[6] <External Interfaces>

Referring to section [1], external interface circuits (405, 407) exercise control to acquire time information from the local timer upon receipt of a first command (Sync), output a second command (Followup) together with timer time information prevailing at the time of the output of the first command, exercise control to acquire the local timer time information at the time of a third command (DelayReq) output, and output a fourth command (DelayResp) together with the local timer time information prevailing upon receipt of the third command.

The above makes it possible to acquire the timer time used for timer time correction from an associated timer in accordance with control exercised by the external interface circuits at the time of predetermined command transmission/reception.

[7] <Acquiring Communication Delay to Compute Timer Time Error>

Referring to section [6], the low-level control module acquires first time information (T2) from the local timer upon receipt of the first command from the high-level control module, acquires second time information (T1) about a high-level timer that prevails when the high-level control module outputs the first command together with the second command, acquires third time information (T3) about the local timer when the third command is output to the high-level control module, acquires fourth time information (T4) about the high-level timer that prevails upon receipt of the third command, the third command being output together with the fourth command by the high-level control module upon receipt of the third command, computes time that is half the sum of the difference between the fourth time information and the first time information and the difference between the third time information and the second time information, acquires the computed time as the communication delay in the communication from the high-level control module to the low-level control module, computes the timer time error by subtracting the communication delay from the difference between the actual transmission time and reception time, and corrects the timer time by using the computed timer time error.

The above makes it easy for the low-level control module to synchronize the local timer time with the timer time of the high-level control module.

[8] <External Interface's Synchronization Engine for Acquiring Information about Command Transmission/Reception and Time>

Referring to section [7], the external interface circuits each include a synchronization control circuit that acquires first time information from the local timer upon receipt of the first command, acquires second time information supplied together with the second command, acquires third time information about the local timer when the third command is output, and acquires fourth time information supplied together with the fourth command.

The above makes it possible to acquire the first to fourth time information without placing the entire burden on a central processing unit. However, it is unavoidable to employ a method of acquiring the first to fourth time information by using some or all of interrupt and other control functions of the central processing unit.

[9] <Central Processing Unit's Computation of Communication Delay and Time Error>

Referring to section [8], the central processing unit computes the communication delay and the time error by using the first to fourth time information acquired by the external interface circuits.

The above eliminates the necessity of preparing a special computation circuit for computing the communication delay and the time error.

[10] <Communication Delay Measurement before Application Process Initiation>

Referring to section [9], the central processing unit measures the communication delay before the start of an application process (S401) and controls a process (S400) of initially correcting the timer time by using the measured communication delay.

To provide an adequate degree of freedom of network configuration, it is preferred that the control modules use different clock oscillators for timer clock generation. When this is taken into consideration, it is obvious that the efficiency of subsequent individual log generation can be increased by synchronizing initially asynchronous timer times before the start of the application process.

[11] <Making Clock Error Correction with Communication Delay in Accordance with Timer Interrupts>

Referring to section [10], after the initial timer time correction, the central processing unit controls a process of correcting timer time with the measured communication delay in accordance with a timer interrupt (S602-2) generated at predetermined intervals.

When the control modules use different clock oscillators for timer clock generation, it is preferred that all clocks used for timer's counting operation oscillate at the same frequency. In reality, however, each oscillation frequency has an error. Therefore, the above-described control scheme makes it possible to prevent a non-negligible error by successively correcting a state where timer times are gradually unsynchronized.

[12] <Attribute Information>

Referring to section [1], the attribute information about the test point includes first identification information allocated to a control module, second identification information indicative of the location of the test point within a program executed by the control module, and third identification information indicative of a process performed at the test point.

The above makes it possible to readily identify information about a unit log acquired for each control module on an individual test point basis.

[13] <Log Analysis Circuit; Collecting Unit Logs to Merge them by Using a Test Point as an Index>

Referring to section [1], the data processing system further includes a log analysis circuit. The log analysis circuit (301) collects unit logs generated for the control modules, consolidates the unit logs by merging test point attribute information, log information, and timestamps by using timestamps included in the collected unit logs as an index, and generates a system log.

The above makes it possible to readily generate the system log from the unit logs and enhance the software analysis efficiency of the entire data processing system.

[14] <Control Modules Configured as in-Vehicle ECUs>

Referring to section [1], the control modules are configured as in-vehicle ECUs coupled to an in-vehicle network.

The above configuration not only permits the evaluation of software for all the in-vehicle networks (802, 803, 804) for the in-vehicle ECUs at a development stage, but also facilitates the evaluation of failure in a particular actual product. Hence, the reliability of an in-vehicle ECU system can be enhanced.

[15] <Control Modules Configured as an Actual Product System and Emulators>

The control modules are configured as an actual product (605), which is to be emulated, or as emulators (604, 606), which emulate the actual product.

The above configuration not only makes it possible to evaluate the actual product with the emulators, but also permits timing evaluation with the system log. More specifically, emulation information derived from the emulators can be compared against an expected value for evaluation purposes. Further, a system model descriptive of a scenario of emulation operations of the actual product and emulators can be compared against the system log for timing evaluation or other purposes.

[16] <Timer-Based Time Synchronization Between Control Modules>

The data processing system (201) is a system in which the control modules (500-1, 500-2, 500-3) operate while communicating with each other. The control modules each include the timer (404) that counts time common to the entire data processing system. The time synchronization process (S400, S405) is performed between the control modules so that the time information derived from the timer in a low-level control module is synchronized with the time information derived from the timer in a high-level control module.

Consequently, even if the control modules are dispersively installed at remote places, the time synchronization process performed between the control modules ensures that the times indicated by the timestamps on the unit logs generated by the control modules can be synchronized on the same time axis.

[17] <Log Acquisition Process>

Referring to section [16], the control modules perform a log acquisition process (S401) during the application process to acquire a log and add a timestamp based on timer time to the acquired log.

Consequently, timestamps indicative of times synchronized on the same time axis within the entire system can be added to the logs acquired by the individual control modules.

[18] <System Log Generation Process>

Referring to section 17, the data processing system further includes a log analysis circuit (301) that collects logs acquired by a log acquisition function of the individual control modules, merges information about the collected logs in accordance with timestamps, and generates a system log of software running in the entire data processing system.

Consequently, the software running in the entire data processing system can be readily evaluated by using the system log.

2. Details of Embodiments

Embodiments of the present invention will now be described in further detail.

<<First Embodiment>>

FIG. 1 illustrates a basic configuration of the data processing system. A later-described actual product 201 is an example of the data processing system. The data processing system includes a plurality of data processing units or control units or other control modules (hereinafter may be simply referred to as the modules). Particularly, attention is focused on the modules that are coupled and provided with series signal paths. Here, more specifically, attention is focused on three modules 500-1, 500-2, 500-3 having series paths 502, 503. Although the modules 500-1, 500-2, 500-3 are provided with the series paths 502, 503, the modules 500-1, 500-2, 500-3 may be additionally provided with some other coupling paths.

The modules 500-1, 500-2, 500-3 each include a central processing unit (CPU) 401-1, 401-2, 401-3, a synchronization timer 404-1, 404-2, 404-3, and communication interfaces 405-1, 407-1, 405-2, 407-2, 405-3, 407-3. The modules 500-1, 500-2, 500-3 perform a required application process and a unit log generation process in accordance with a program that is executed by the modules 500-1, 500-2, 500-3. Further, the modules 500-1, 500-2, 500-3 perform a time synchronization process to synchronize timer times, namely, measured values.

The unit log generation process is a process in which the CPU 401-1, 401-2, 401-3 in each module 500-1, 500-2, 500-3 generates unit logs on an individual module basis. More specifically, the unit log generation process is performed to generate log information and a timestamp at a test point designated by a program executed by the CPU in accordance with time derived from the synchronization timer 404-1, 404-2, 404-3, and accumulate the generated log information and timestamp together with attribute information about the test point.

The time synchronization process is performed to synchronize time information carried by the timestamps generated by the synchronization timers 404-1, 404-2, 404-3. In other words, the time synchronization process is performed to assure that the time information derived from the synchronization timers 404-1, 404-2, 404-3 is expressed on the same time axis. In the time synchronization process, for example, the module 500-2 receives information about the time of the synchronization timer 404-1 from the module 500-1, which is a high-level module from the viewpoint of time management, and corrects the time of the local synchronization timer 404-2 in accordance, for instance, with the received information about the time and with the information about the time of the local synchronization timer 404-2 that prevails when the information about the time of the synchronization timer 404-1 is received. The times of the synchronization timers 404-1, 404-2, 404-3 may be corrected by correcting time information derived from the local synchronization timer 404-1, 404-2, 404-3 or by correcting the counting operation of the local synchronization timer 404-1, 404-2, 404-3 with, for example, a preset count value. A process of correcting the times of the synchronization timers 404-1, 404-2, 404-3 may be performed, for instance, by the CPU as a part of a power-on reset process or at the beginning of a predetermined processing routine. If a non-negligible error occurs over time in the synchronization of time information after a correction process in a situation where the clock signal frequencies of the synchronization timers 404-1, 404-2, 404-3 in the modules 500-1, 500-2, 500-3 are not exactly the same, the correction process may be performed again after an appropriate interval.

When the data processing system, which is handled as an actual product, is operated to let the modules 500-1, 500-2, 500-3 generate their respective unit logs, and the resulting pieces of log information about the generated unit logs of the modules 500-1, 500-2, 500-3 are merged by using a timestamp as an index, data processing performed by using the modules of the actual product can be evaluated with ease.

The data processing system and a processing procedure for evaluating the data processing system will now be described in detail.

Figure 2:
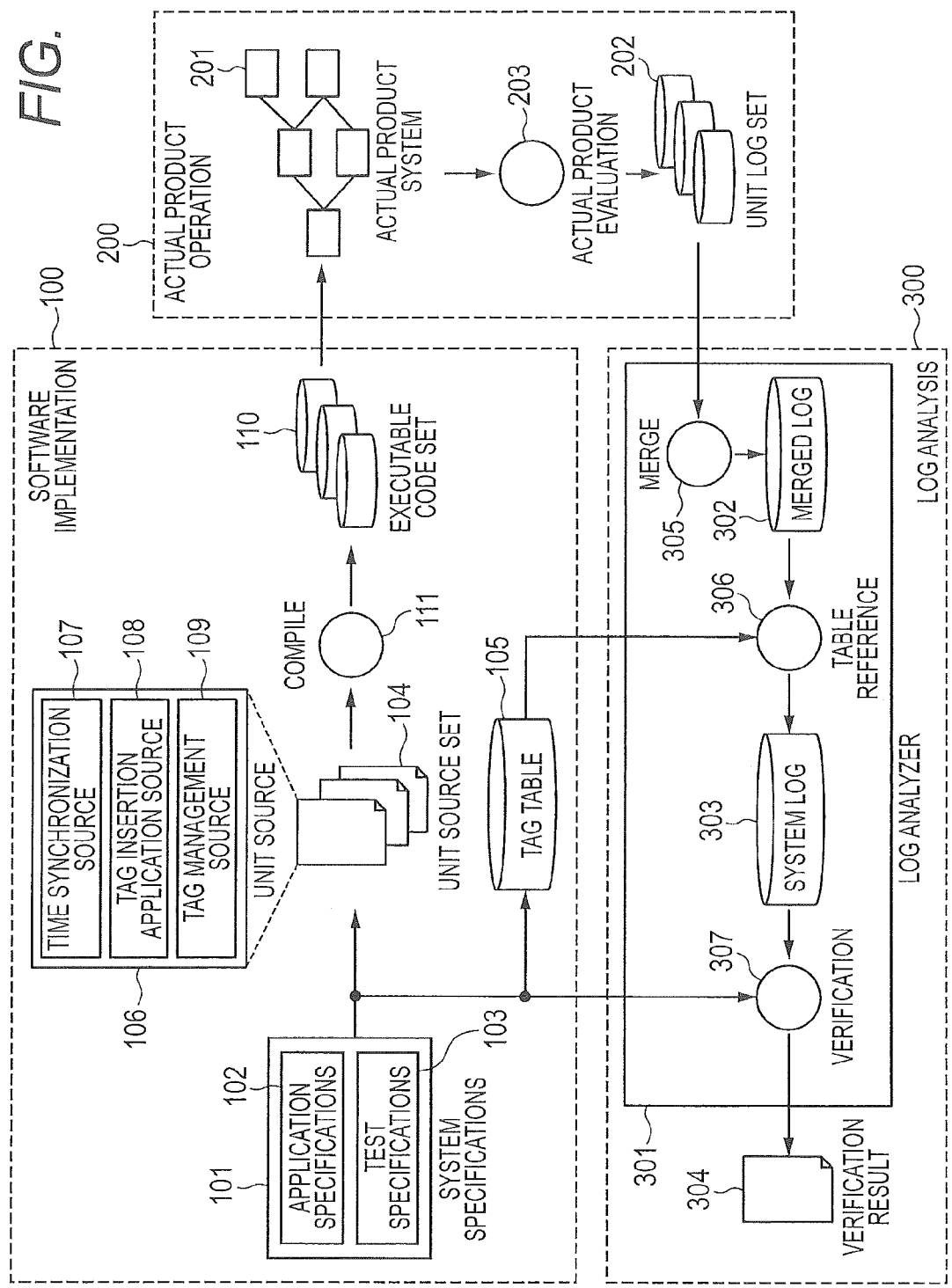
FIG. 2 is a diagram illustrating an evaluation procedure for software analysis.

FIG. 2 illustrates an overall procedure of evaluating the data processing system.

Figure 3:
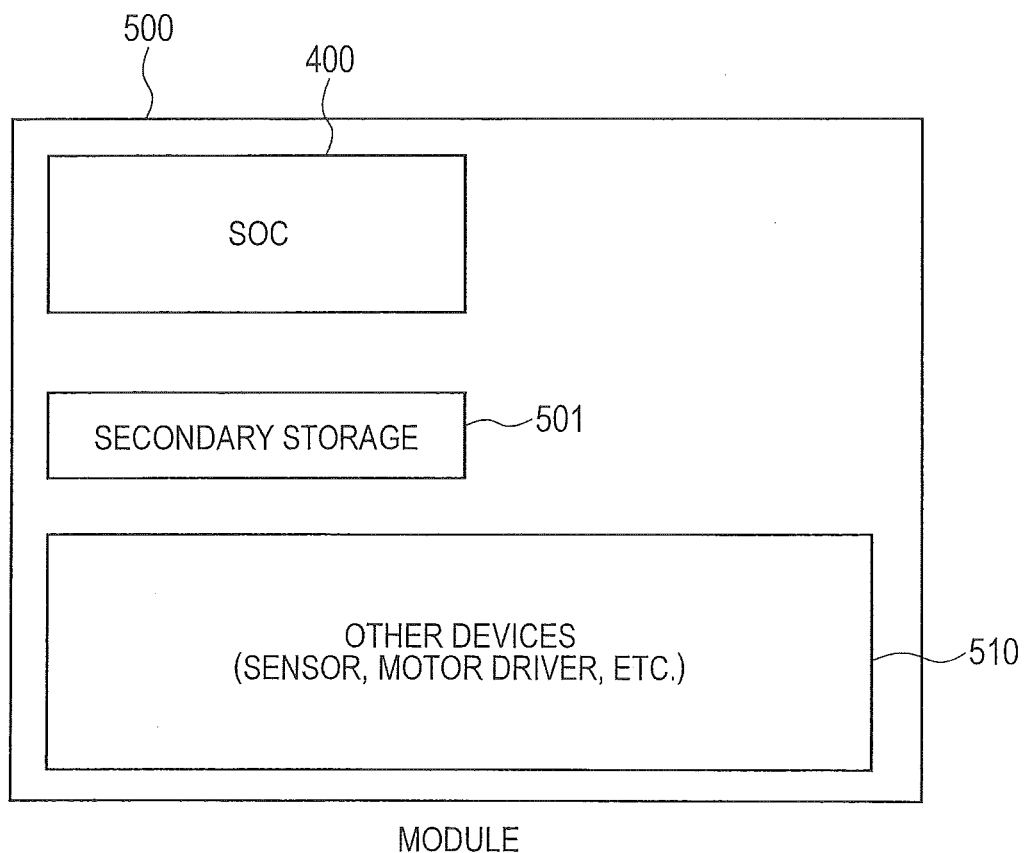
FIG. 3 is a block diagram illustrating the configuration of a module.

The following description deals with a case where an actual product system 201 configured as the data processing system formed of three units of the module 500 depicted in FIG. 3 is subjected to operation analysis. The actual product system 201 corresponds to the data processing system depicted in FIG. 1. As illustrated in FIG. 3, the module 500 includes an SOC (a system on a chip formed of a single semiconductor chip) 400, a secondary storage medium 501, and other devices 510.

Figure 4:
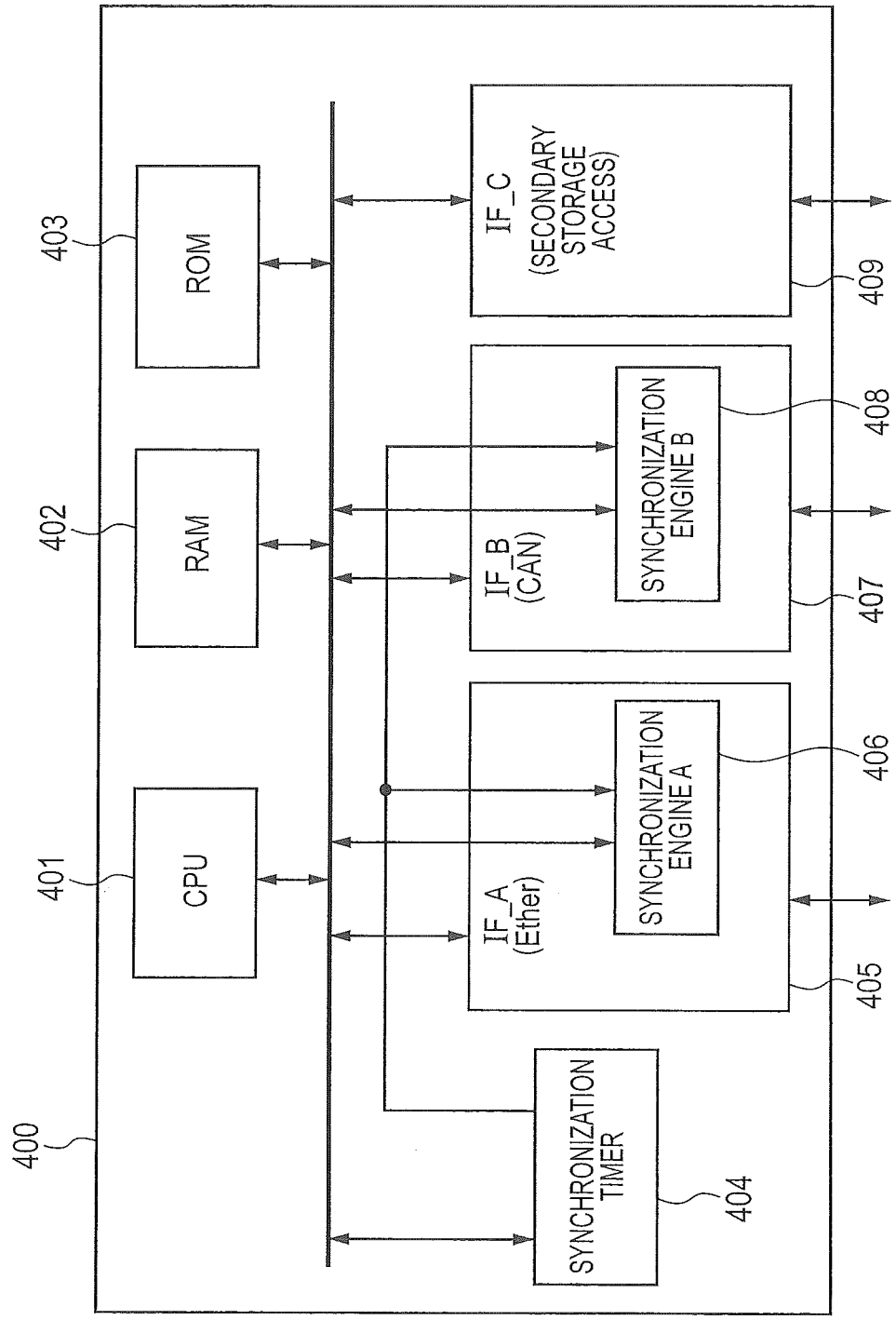
FIG. 4 is a block diagram illustrating the configuration of an SOC.

As depicted in FIG. 4, the SOC 400 includes a synchronization timer 404 for achieving time synchronization with an external module, communication interfaces (IF_A 405, IF_B 407) having a built-in synchronization engine (synchronization engine A 406, synchronization engine B 408) for providing assistance to the time synchronization process, an interface IF_C 409 for communicating with the secondary storage medium, and a CPU 401. Synchronization engine A 406 and synchronization engine B 408 are not specifically limited, but are capable of acquiring and retaining the time information about the synchronization timer in the local module when transmitting or receiving a later-described predetermined command. The retained time information is used in the time synchronization process. The use of the retained time information will be described in detail later.

Figure 5:
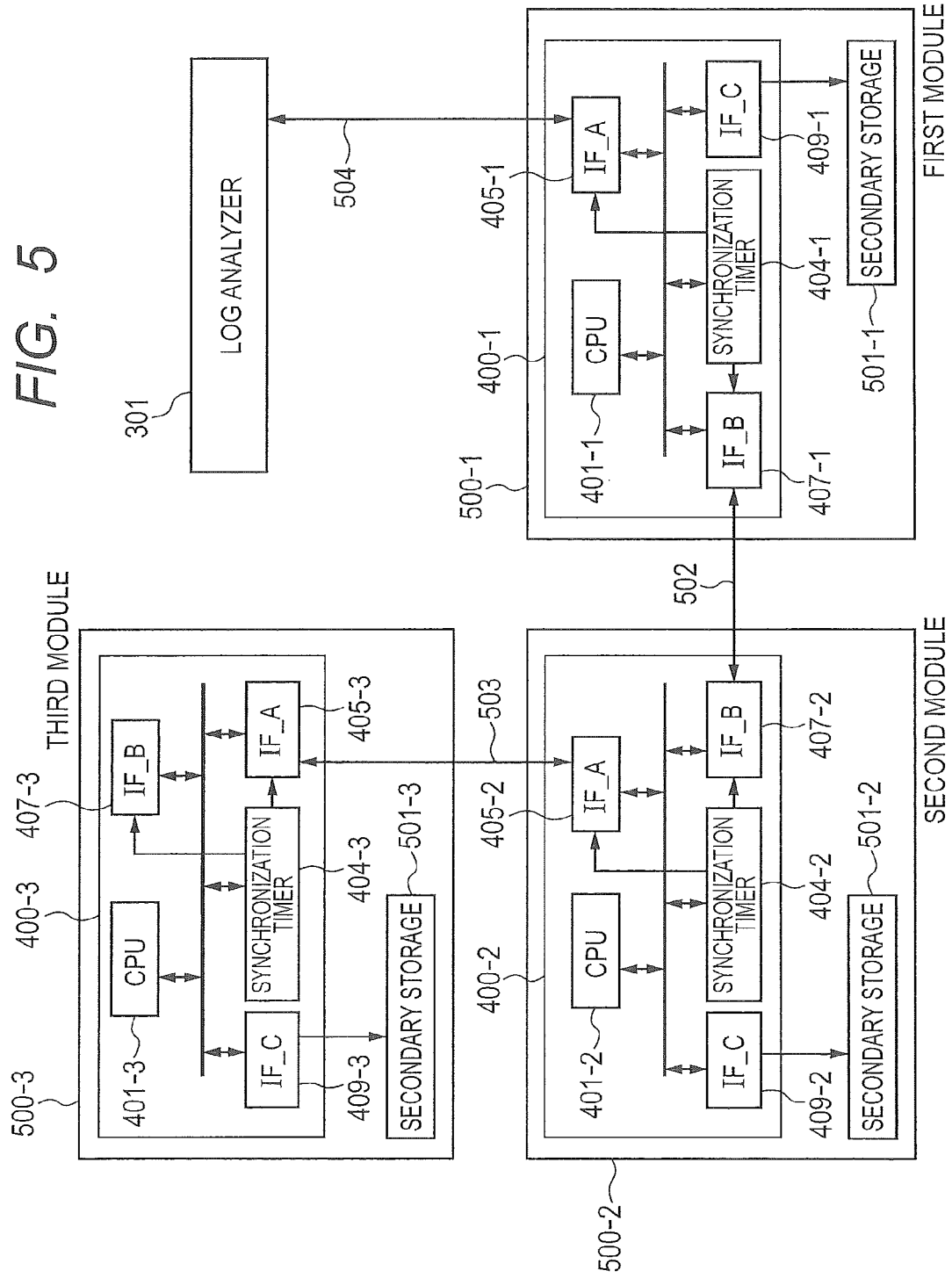
FIG. 5 is a block diagram illustrating the configuration of an actual product system according to a first embodiment of the present invention.

FIG. 5 illustrates how the individual modules are coupled within the actual product system 201. As described with reference to FIG. 1, the three modules 500-1, 500-2, 500-3 are coupled. The first module 500-1 is coupled to the second module 500-2 through a communication path 502. The second module 500-2 is coupled to the third module 500-3 through a communication path 503. The three modules 500-1, 500-2, 500-3 are daisy-chained to form a system.

The processing procedure for evaluation can be divided into software implementation 100, actual product operation 200, and log analysis 300. The procedure for software implementation 100 is performed to formulate the specifications for software and implement the software. The procedure for actual product operation 200 is performed to actually operate the actual product system 201 and acquire a unit log set 202 of the software. The procedure for log analysis 300 is performed to analyze the unit log set 202 and generate a system log 303 and a verification result 304. The unit log set 202 is a set of the aforementioned unit logs.

The procedure for software implementation 100 is performed to create a unit source set 104 and a tag table 105 in accordance with system specifications 101. The unit source set 104 is a collection of source codes implemented in each module 500. The system specifications 101 include application specifications 102, which define functions (applications) to be implemented by the actual product system 201, and test specifications 103, which define test items. The unit source set 104 generated in accordance with the system specifications 101 includes the functions of the applications and the source codes for software analysis.

Figure 6:
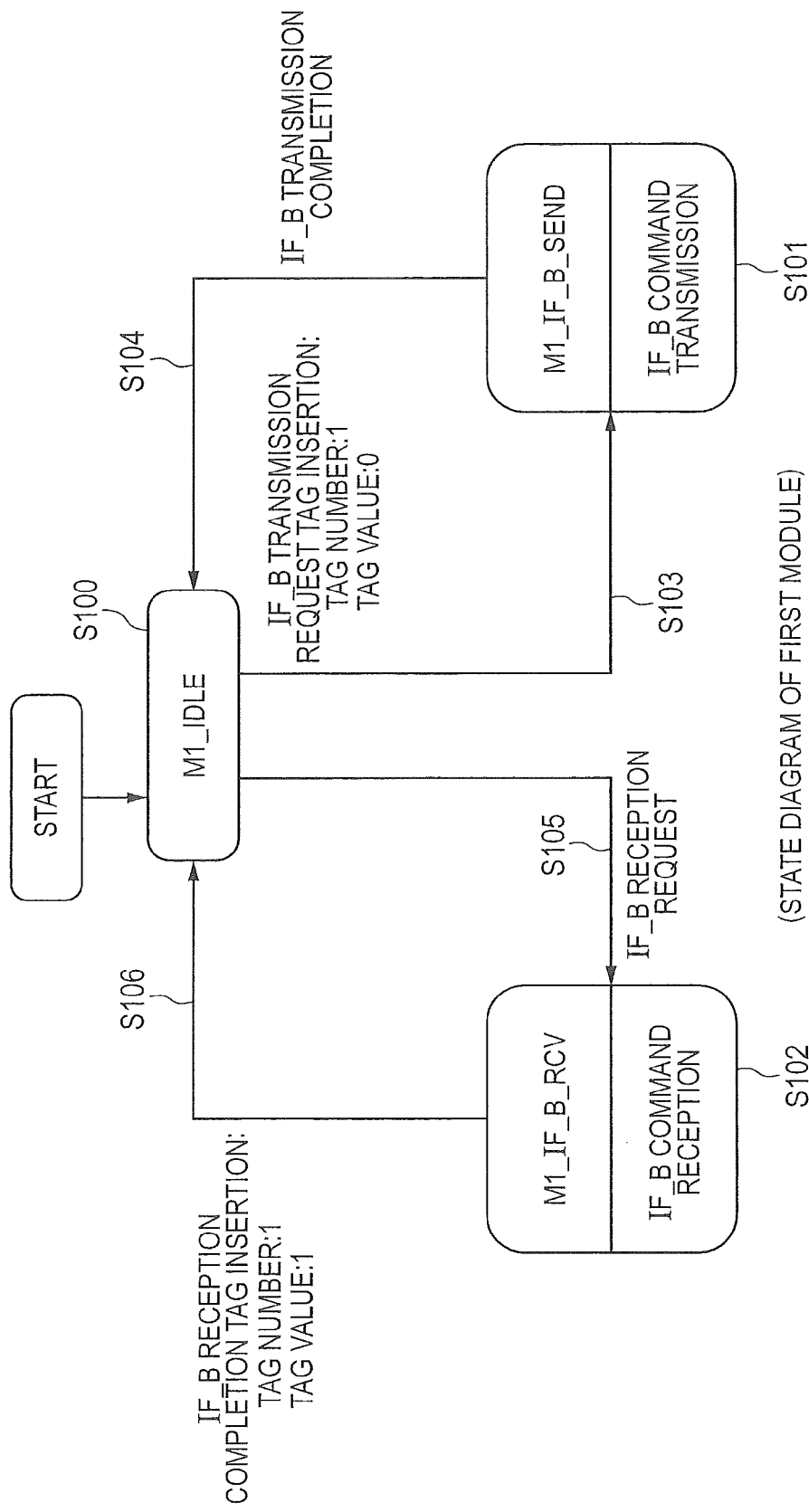
FIG. 6 is a software state diagram illustrating a first module.
Figure 7:
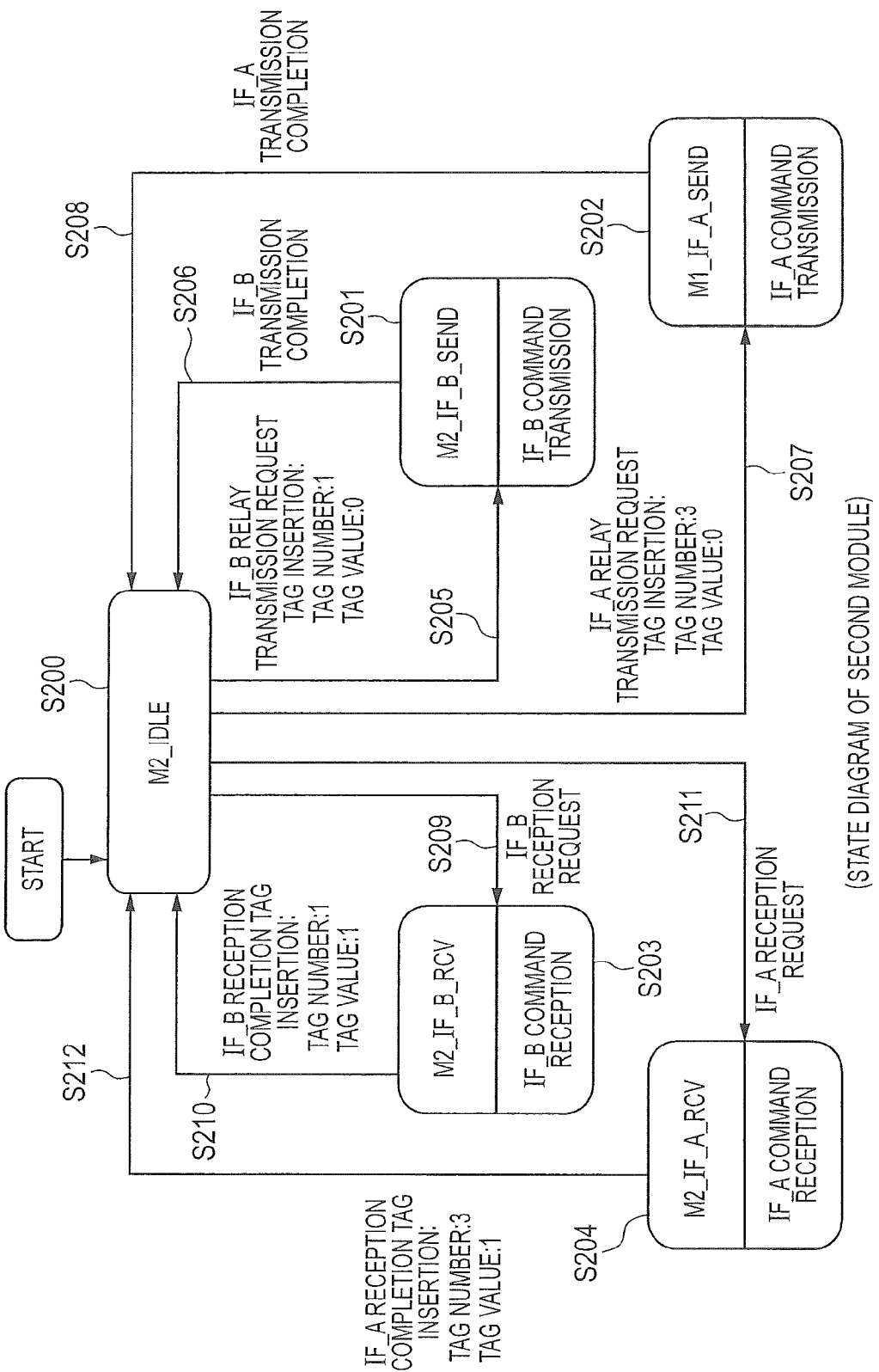
FIG. 7 is a software state diagram illustrating a second module.
Figure 8:
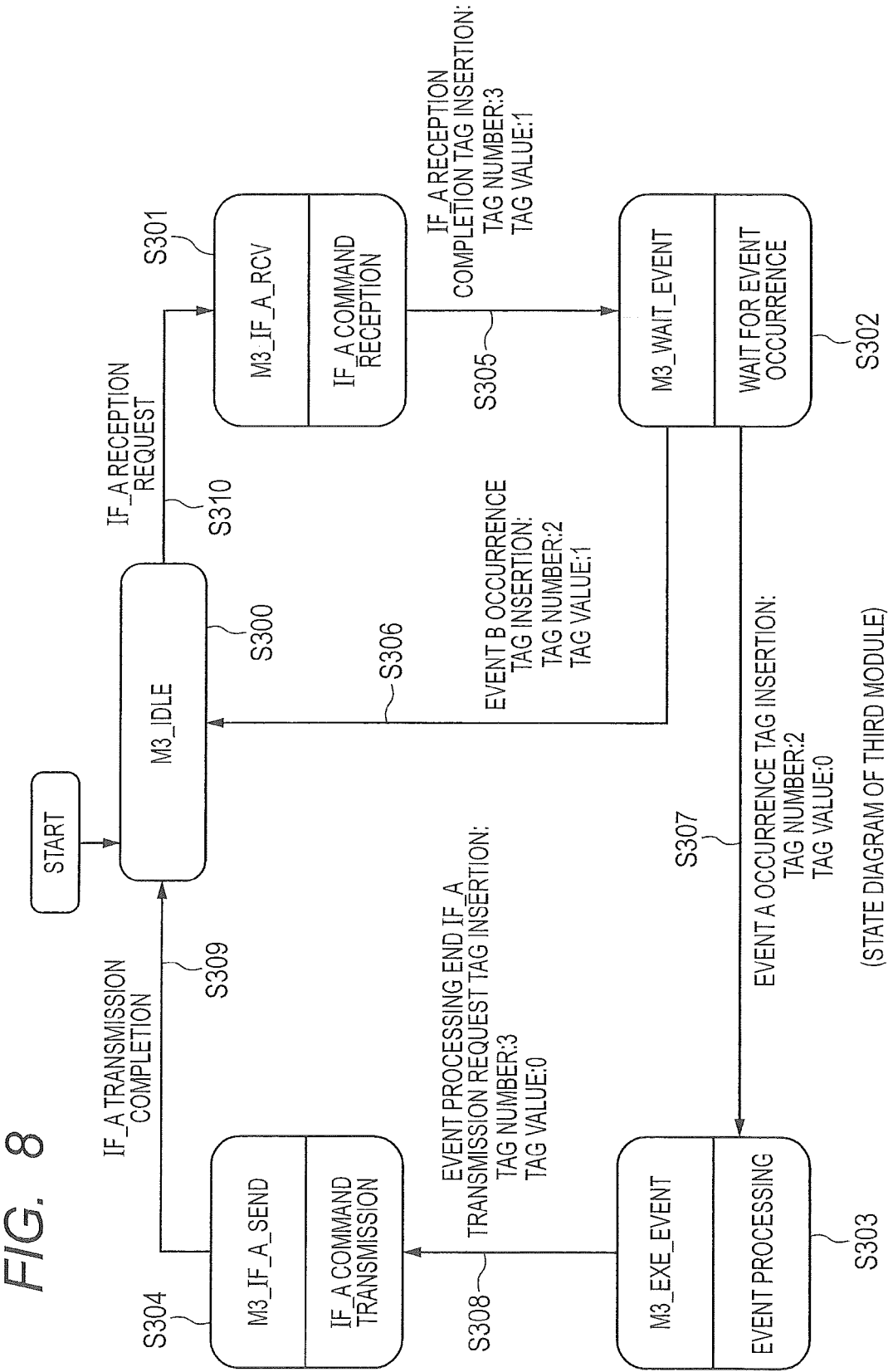
FIG. 8 is a software state diagram illustrating a third module.

FIGS. 6, 7, and 8 are state diagrams illustrating the application specifications 102 for the individual modules. The state diagram depicted in FIG. 6 is implemented in the first module 500-1. The state diagram depicted in FIG. 7 is implemented in the second module 500-2. The state diagram depicted in FIG. 8 is implemented in the third module 500-3. Although not specifically limited, the application specifications 102 described here define an operation in which a command transmitted from the first module 500-1 to the second module 500-2 is forwarded to the third module 500-3 through the second module 500-2 to let the third module 500-3 choose in accordance with an event generated upon receipt of the command whether or not to return a response to the first module 500-1. Referring, for instance, to FIG. 6, when an IF_B transmission request is generated (S103) while the CPU 401-1 of the first module 500-1 is in an idle state S100, an interface command of the interface IF_B is given to the interface IF_B 407-1 to complete the IF_B transmission by the interface IF_B 407-1 (S104). Accordingly, when an IF_B reception request (S209) is generated, the second module 500-2 depicted in FIG. 7 uses the interface IF_B 407-2 to receive the interface command of the interface IF_B (S203) and completes the command reception by the interface IF_B (S210). Further, when an IF_A relay transmission request is generated (S207) in the second module 500-2, the interface IF_A 405-2 performs a command transmission process (S202) to complete the transmission of the command to the module 500-3 (S208). Subsequently, when an IF_A reception request (S310) is generated, the third module 500-3 depicted in FIG. 8 uses the interface IF_A 405-2 to perform an IF_A command reception process (S301) to complete the reception of the relayed command (S305). This causes the third module 500-3 to switch into a command wait state (S302). Subsequently, when, for instance, event A is generated (S307), an event process is performed (S303), and then a transmission request for notifying the termination of the event process is generated (S308). Accordingly, an IF_A interface command is given to the interface IF_A 405-3 to complete the transmission of the event termination notification by the interface IF_A 403-1 (S309). Subsequently, the second module 500-2 performs processes S211, S204, and S212, uses the interface IF_IA 405-2 to receive an event process termination notification, and performs processes S205, S201, and S206 to let the interface IF_B 407-2 transmit the event process termination notification. Finally, the first module 500-1 performs processes S105, S102, and S106 as indicated in FIG. 6 to receive the event process termination notification.

A unit source 106 includes a time synchronization source 107, a tag insertion application source 108, and a tag management source 109. The time synchronization source 107 makes adjustments so as to equalize the values of the synchronization timers (404-1, 404-2, 404-3) of the modules (500-1, 500-2, 500-3) included in the actual product system 201. The tag insertion application source 108 is obtained when a tag statement is inserted into a source code for an application process. The tag statement is inserted into the test point defined by the test specifications 103. When the program reaches the tag statement, the tag statement starts a tag management process to notify tag information.

The tag information includes a net ID, a tag number, and a tag value. The net ID is a unique identification number assigned to each module. In the present embodiment, a net ID of 1 is statically assigned to the first module 500-1, a net ID of 2 is statically assigned to the second module 500-2, and a net ID of 3 is statically assigned to the third module 500-3. Although the net IDs are statically assigned in the present embodiment, they may be dynamically assigned depending on the conditions. The tag number and the tag value are pieces of information used for test point identification. Thus, the tag information including the net ID, the tag number, and the tag value is defined as an example of attribute information about the test point. In the present embodiment, the tag statement is inserted into sources corresponding to S103 and S106 in FIGS. 6, S205, S207, S210, and S212 in FIGS. 7, and S305, S306, S307, and S308 in FIG. 8.

The tag management source 109 is a source code in which the tag management process is implemented. The tag management source 109 generates a unit log that is obtained by adding the time of the synchronization timer 404 to the tag information, and performs a tag information management process, for example, to buffer information into a RAM 402, which is a primary storage, and save a unit log into a ROM 403, which is a secondary storage, and/or a secondary storage medium 501. The secondary storage medium 501 is a nonvolatile memory including a dynamic random access memory, a static random access memory, or a memory card.

The tag table 105 is a table that manages the tag information. As depicted in FIG. 13, the tag table 105 shows the relationship between tag numbers, tag values, and converted values. The tag table 105 is referenced to convert the tag information derived from actual product evaluation 203 into an arbitrary form. The converted values may be changed in accordance with an employed software analysis method. In the present embodiment, the converted values are in text form.

The unit source set 104 is compiled 111 to obtain an executable code set 110. The executable code set 110 is a set of binary codes executable by the CPU 401 in each module 500. The actual product system 201 is built by writing the executable code set 110 into the ROM 403.

In the actual product operation 200, the unit log set 202 is obtained by subjecting the actual product system 201 to actual product evaluation 203.

In the above instance, the modules are coupled by the interfaces (IF_A 405, IF_B 407) having a synchronization engine. The actual product system 201 is capable of synchronizing the times of the synchronization timers 404-1, 404-2, 404-3 by performing the power-on reset process or by performing the time synchronization process after the start of actual product evaluation 203. The secondary storage medium (501-1, 501-2, 501-3) is coupled to the interface IF_C (409-1, 409-2, 409-3) of each module. A unit log derived from actual product evaluation is buffered into the RAM 402 and then stored in the secondary storage medium (501-1, 501-2, 501-3) of each module. The secondary storage medium (501-1, 501-2, 501-3) is used as a save destination when the size of the unit log is larger than that of the RAM 402. If the unit log is smaller in size than the RAM 402, the unit log need not be saved into the secondary storage medium (501-1, 501-2, 501-3).

Figure 9:
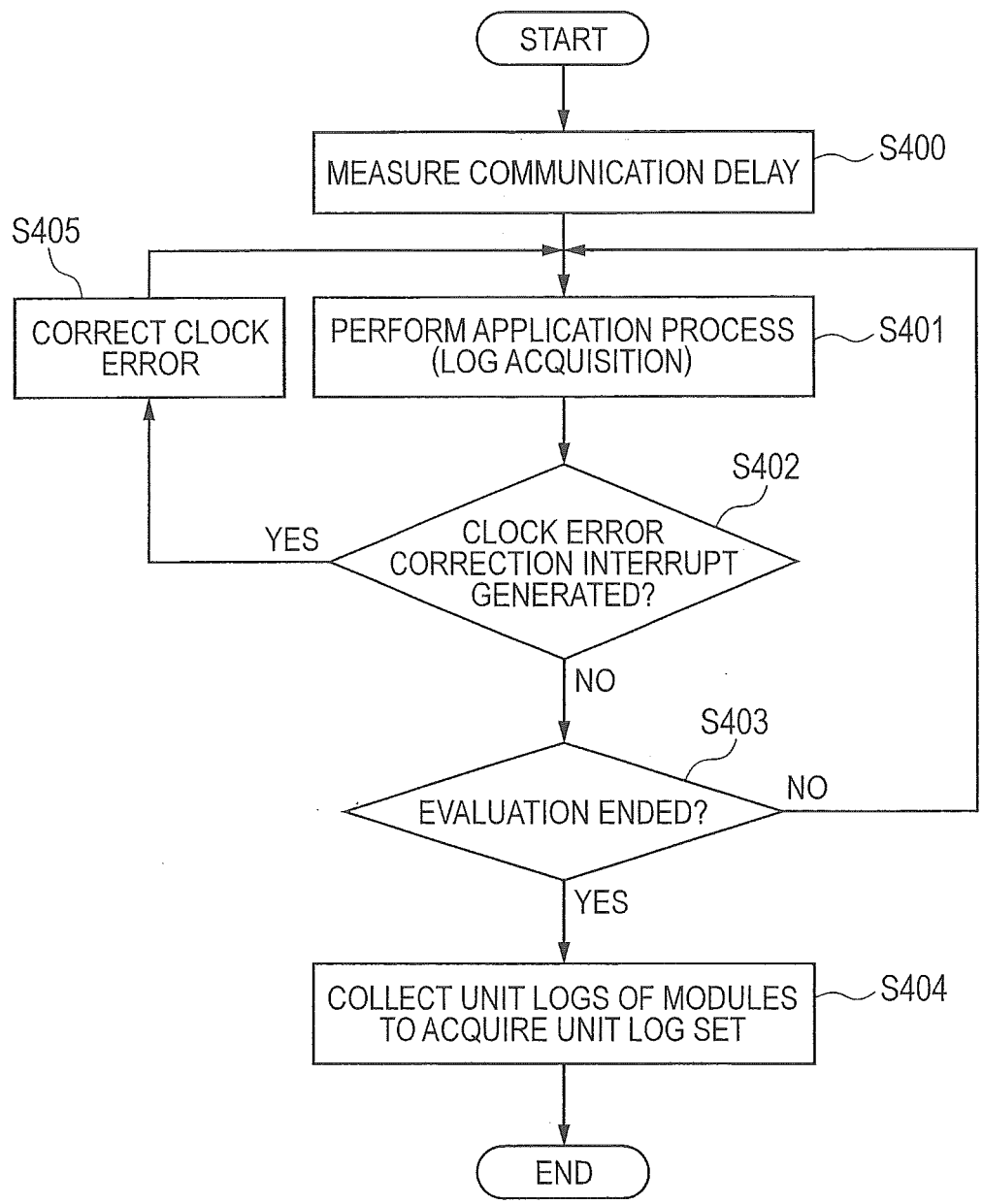
FIG. 9 is a flowchart illustrating a procedure for actual product evaluation.

FIG. 9 illustrates the procedure for actual product evaluation. The actual product evaluation includes an application process S401 and a time synchronization process (S400, S405). The time synchronization process is performed to synchronize the times of the synchronization timers of the modules (that is, synchronize the times counted by the timers). For example, IEEE 1588 for Ethernet (registered trademark) is a relevant existing processing standard. As there is no existing standard for non-Ethernet interfaces, it is assumed here that the time synchronization process is performed on the basis, for instance, of the algorithm of IEEE 1588.

The time synchronization process will now be described. The time synchronization process is a process of transmitting time information through an interface and synchronizing the value of the synchronization timer 404 at a receiving end with the value of the synchronization timer 404 at a transmitting end. The time synchronization process mainly includes a communication delay measurement process and a clock error correction process.

As an example of the time synchronization process, the time synchronization process between the first module 500-1 and the second module 500-2 is described below. It is assumed in the example that the first module 500-1 is at a transmitting end while the second module 500-2 is at a receiving end, and that the process is performed to synchronize the value of the synchronization timer 404-2 with the value of the synchronization timer 404-1. Synchronization engine A 406 is implemented in the interface IF_A 405 that couples the first module 500-1 to the second module 500-2. Synchronization engine A 406 is capable of acquiring the value of the synchronization timer 404 when a time synchronization command is transmitted or received. In the configuration depicted in FIG. 5, the first module 500-1 can acquire the time of the synchronization timer 404-1 as synchronization command transmission/reception time, whereas the second module 500-2 can acquire the time of the synchronization timer 404-2 as the synchronization command transmission/reception time.

The communication delay measurement process (S400) will now be described.

For example, let us assume a case where the time synchronization process is performed to transmit the time of the synchronization timer 404-1 in the first module 500-1 and rewrite the time of the synchronization timer 404-2 in the second module 500-2. If the timer value is simply rewritten, the time of the synchronization timer 404-2 is delayed from the time of the synchronization timer 404-1 by a communication delay time Tdelay. In the time synchronization process, therefore, the communication delay time Tdelay is measured and used as a correction value for time synchronization at the receiving end.

Figure 10:
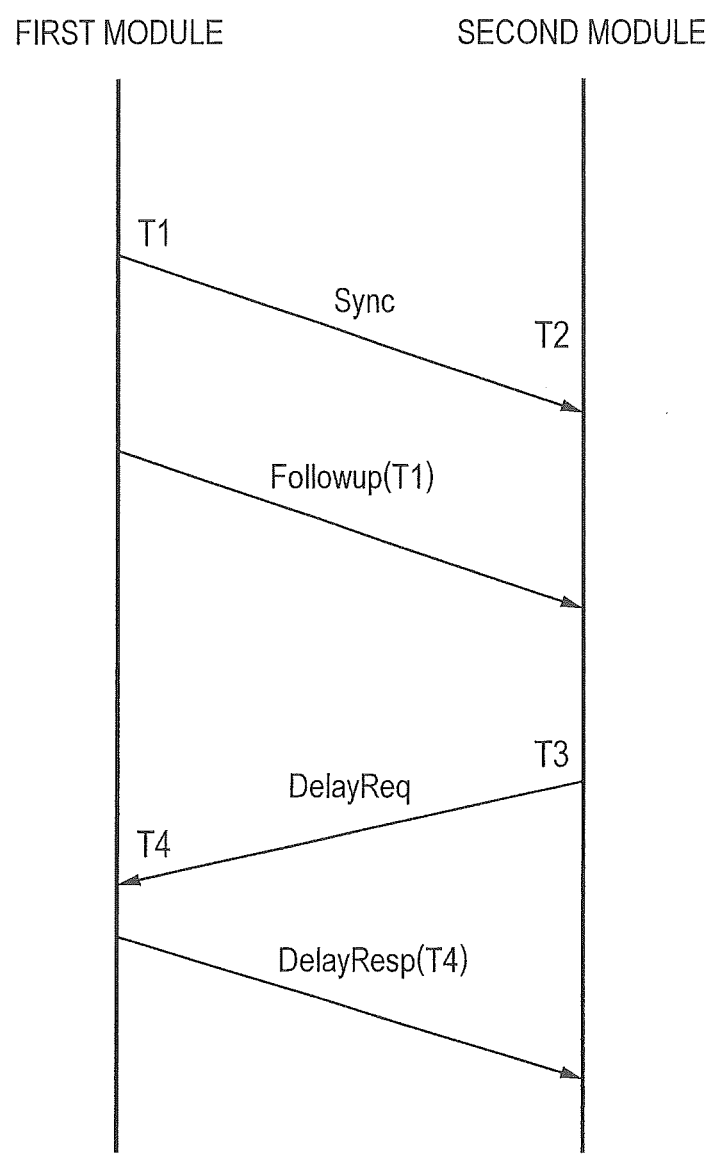
FIG. 10 is an operation timing diagram illustrating a communication delay measurement during a time synchronization process.

FIG. 10 illustrates a procedure of measuring a communication delay in the communication path 502. Let us assume that different values are recorded in the synchronization timers 404-1, 404-2 in an initial state. The first module 500-1 first transmits a synchronization command (Sync). This causes the first module 500-1 to acquire a transmission time T1 and the second module 500-2 to acquire a reception time T. Next, the first module 500-1 transmits a follow-up command (Followup) to notify the second module 500-2 of the transmission time T1. Upon receipt of the follow-up command (Followup), the second module 500-2 issues a delay request command (DelayReq). This causes the second module 500-2 to record a transmission time T3 and the first module 500-1 to record a reception time T4.

Finally, the first module 500-1 issues a delay response command (DelayResp) to notify the second module 500-2 of the reception time T4. This causes the second module 500-2 to acquire the times T1, T2, T3, and T4.

The communication delay Tdelay in the communication path 502, that is, the time required for communication, can be determined by Equation 1 below:

$$T\text{delay}=((T4-T1)-(T3-T2))/2 \qquad \text{Equation 1}$$

Here, it is assumed that the communication delay for transmission is equal to the communication delay for reception.

The difference (time difference) Tdiff between the synchronization timer 404-1 and the synchronization timer 404-2 is determined by Equation 2 below:

$$T\text{diff}=T2-(T1+T\text{delay}) \qquad \text{Equation 2}$$

When the value Tdiff is subtracted from the time of the synchronization timer 404-2, the value of the synchronization timer 404-2 is equal to the value of the synchronization timer 404-1. When the communication delay is to be measured for correction in the synchronization process, the count value of the synchronization timer 404-2 may be preset so that the value Tdiff is subtracted from the count value.

The clock error correction process will now be described.

Figure 11:
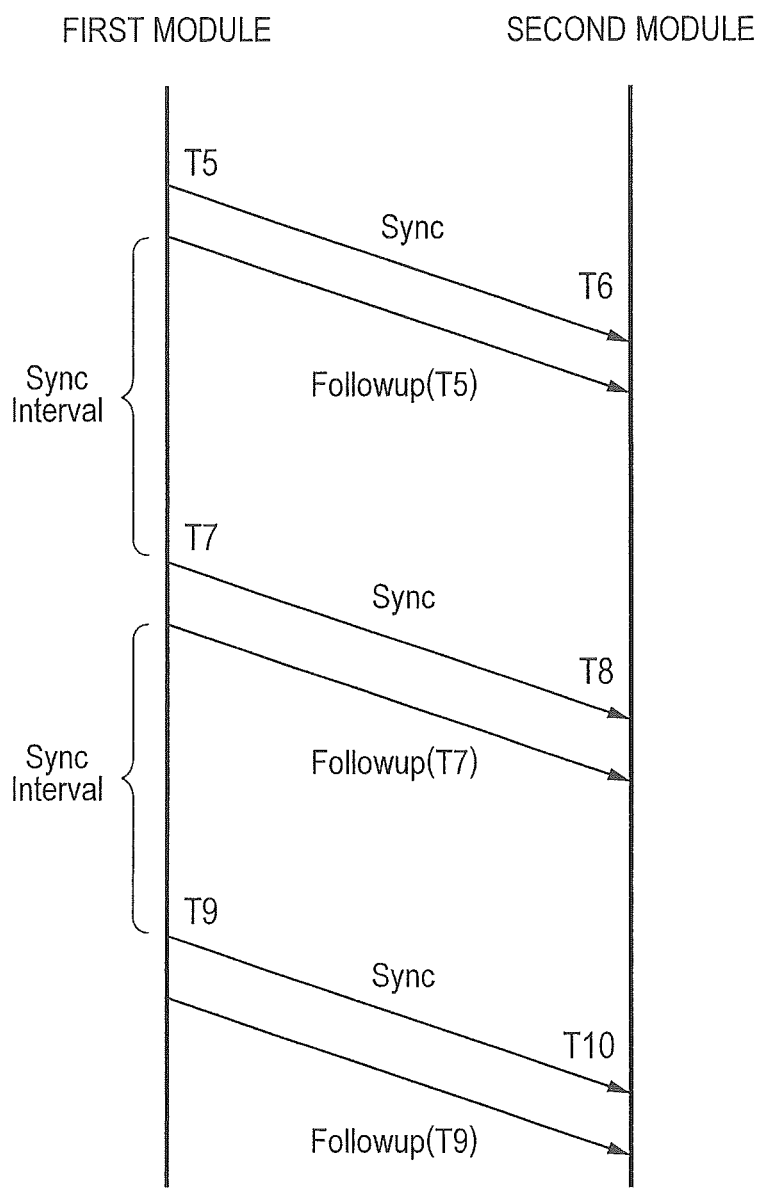
FIG. 11 is an operation timing diagram illustrating a clock error correction sequence for time processing.

FIG. 11 illustrates a communication sequence in the clock error correction process. The clock error correction process is performed for the purpose of correcting a clock frequency error, which may occur because the synchronization timers 404 use different clock oscillators. In an actual product system, it is preferred that the synchronization timers (404-1, 404-2, 404-3) use different clock oscillators in order to acquire an adequate degree of freedom of network configuration. In this instance, it is desirable that all the clock oscillators, which drive the synchronization timers 404, oscillate at the same frequency. In reality, however, the counts of the synchronization timers 404 deviate from each other during a continuous counting operation as each oscillation frequency has an error. In other words, the result of correction for synchronization based on communication delay measurement may become erroneous over time. As such being the case, the synchronization command (Sync) and the follow-up command (Followup) are periodically transmitted during the clock error correction process to correct the synchronization timers 404. Referring to FIG. 11, a count error Tcd is calculated from Equation 3 below when the first module 500-1 transmits the synchronization command (Sync) at time T5 and the second module 500-2 receives the synchronization command (Sync) at time T6:

$$Tcd=T6-(T5+Tdelay) \qquad \text{Equation 3}$$

When Tcd is subtracted from the value of the synchronization timer 404-2 of the second module 500-2, the value of the synchronization timer 404-2 is equal to the value of the synchronization timer 404-1. The error is corrected in this manner.

A synchronization interval (Sync Interval), which represents the frequency at which the clock error correction process is performed, varies with implementation conditions. If the clock oscillators have high accuracy, the frequency may be low. However, if the clock oscillators have low accuracy, the clock error correction process needs to be frequently performed. In the present embodiment, it is assumed that the synchronization interval (Sync Interval) is 1 second.

Figure 12:
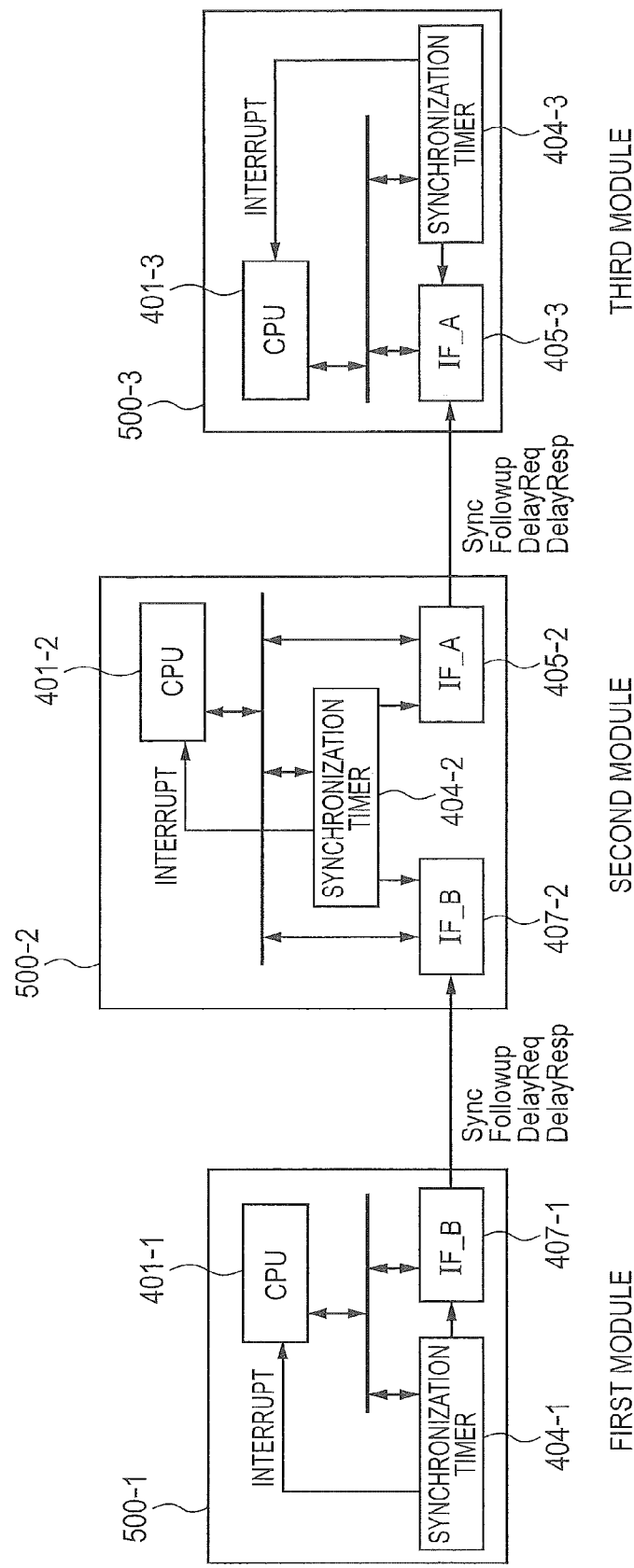
FIG. 12 is a diagram illustrating the time synchronization process relationship between the modules.

FIG. 12 illustrates the time synchronization process relationship between the modules according to the present embodiment. In the present embodiment, the synchronization timer 404-1 of the first module 500-1 serves as the reference so that the synchronization timers 404 of the second and third modules 500-2, 500-3 are synchronized with the reference.

When the power is turned on, the first and second modules 500-1, 500-2 perform the communication delay measurement process (step S400) between the interfaces IF_B (407-1, 407-2). The second module 500-2 performs a communication process depicted in FIG. 10 and acquires the transmission/reception times T1, T2, T3, and T4 from synchronization engine B 408. The CPU 401-2 calculates Tdelay and Tdiff from the transmission/reception times. Upon completion of the communication delay measurement process, the CPU 401-2 of the second module 500-2 uses the value Tdiff to synchronize the time of the synchronization timer 404-2 with the time of the synchronization timer 404-1.

Further, the synchronization timer 404-1 of the first module 500-1 generates a periodic interrupt and requests the CPU 401-1 to perform the clock error correction process. Upon request, the CPU 401-1 performs a communication process depicted in FIG. 11 to correct the clock error in the second module 500-2. The second module 500-2 performs a communication process depicted in FIG. 11 and acquires the transmission/reception times T5 and T6 from synchronization engine B 408. The CPU 401-2 calculates Tcd from the transmission/reception times T5 and T6 and corrects the error in the synchronization timer 404-2.

The third module 500-3 performs the time synchronization process with respect to the second module 500-2 in order to synchronize the synchronization timer 404-3 with the synchronization timer 404-2. As the second module 500-2 is synchronized with the first module 500-1, the third module 500-3 is also synchronized with the first module 500-1.

When the measurement sequence of the evaluation procedure depicted in FIG. 9 is initiated, the communication delay measurement process S400 measures the communication delay and synchronizes the synchronization timers (404-1, 404-2, 404-3). Upon completion of synchronization, the application process S401 is performed. The clock error correction process S405 is performed each time a clock error correction interrupt (S402) is generated for the clock error correction process. Processing steps S401, S402, S403, and S405 are then repeated until the end of evaluation is verified in step S403.

Figure 20:
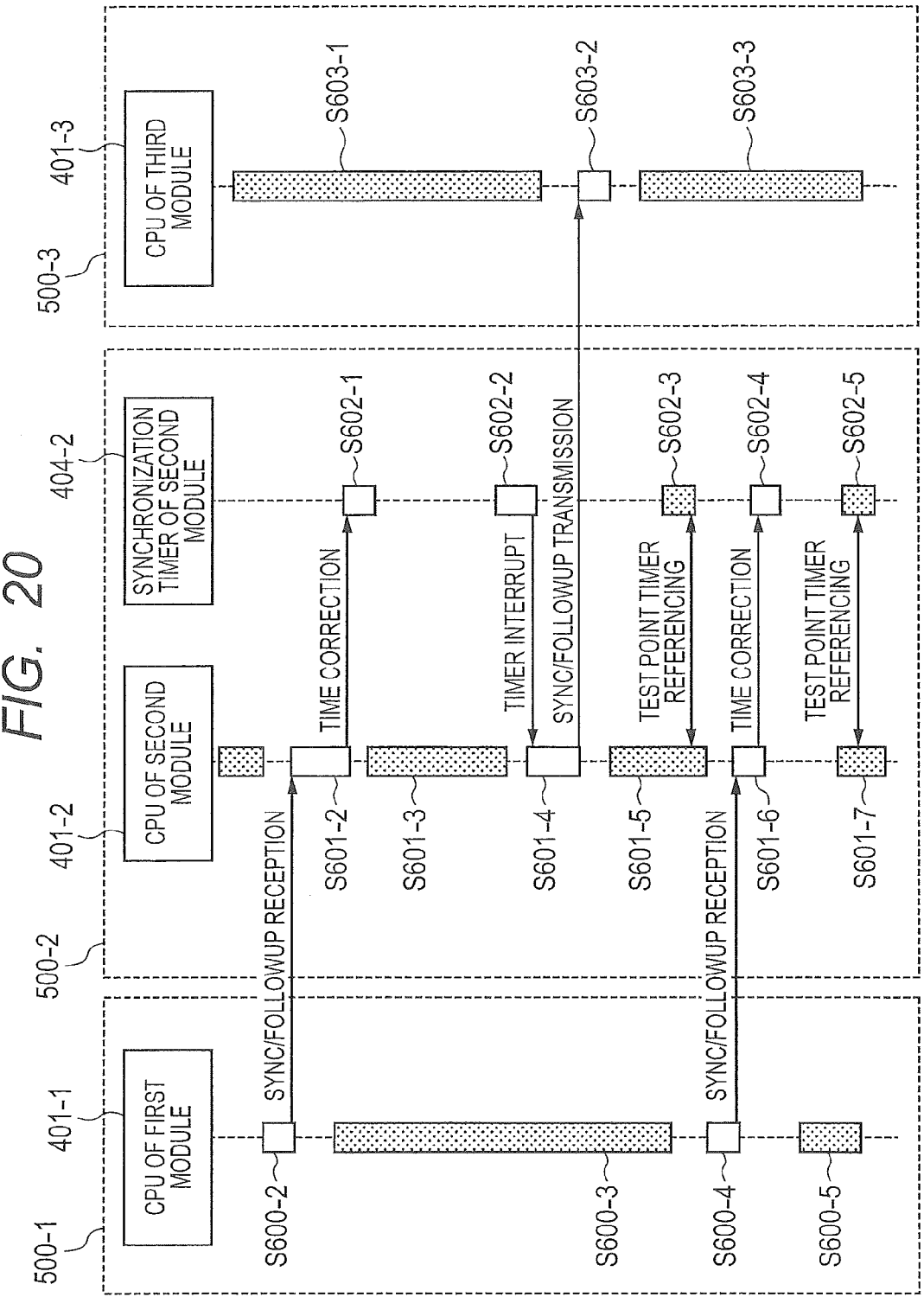
FIG. 20 is a timing diagram illustrating the relationship between an application process and a clock error correction process that are performed in the second module.

FIG. 20 illustrates the relationship between the application process S401 and clock error correction process S405 that are performed in the second module 500-2. In FIG. 20, shaded tasks (for example, S600-3) represent the application process S401, whereas white tasks (for example, S600-2) represent the clock error correction process S405.

The second module 500-2 receives an error correction process signal (receives Sync/Followup) from the first module 500-1 and synchronizes the synchronization timer 404-2 with the first module 500-1. Further, the second module 500-2 transmits the error correction process signal (transmits Sync/Followup) to the third module 500-3 and synchronizes the synchronization timer 404-3 of the third module 500-3 with the second module 500-2.

The CPU 401-2 of the second module 500-2 mainly performs the application process. The CPU 401-2 references the synchronization timer 404-2 (S601-5, S602-3) at a test point and outputs a log. Upon receipt of the error correction process signal (upon receipt of Sync/Followup) 601-2, the CPU 401-2 interrupts the application process, initiates the clock error correction process, and corrects the synchronization timer 404-2.

The synchronization timer 404-2 generates an interrupt to interrupt the CPU 401-2 each time the synchronization interval (Sync Interval) is elapsed (S602-2). Upon receipt of the interrupt, the CPU 401-2 transmits the error correction process signal (transmits Sync/Followup) S601-4, S603-2 to the third module 500-3 and corrects the synchronization timer 404-3 of the third module 500-3.

When the synchronization process is performed between the individual modules, timestamps based on the same time axis can be added to the unit logs in all the modules.

Returning to FIG. 9, when the evaluation of the actual product is terminated (S403), the unit logs accumulated in the secondary storages of the modules are collected (S404). In the present embodiment, a log analyzer 301 is coupled to the interface IF_A 405-1 of the first module 500-1 in order to acquire the unit logs by communication. The unit log of the third module 500-3 is transmitted to the second module 500-2 through the communication path 503. The unit log of the second module 500-2 is transmitted to the first module 500-1 through the communication path 502. The unit log of the first module 500-1 is transmitted to the log analyzer through a communication path 504.

Figure 14:
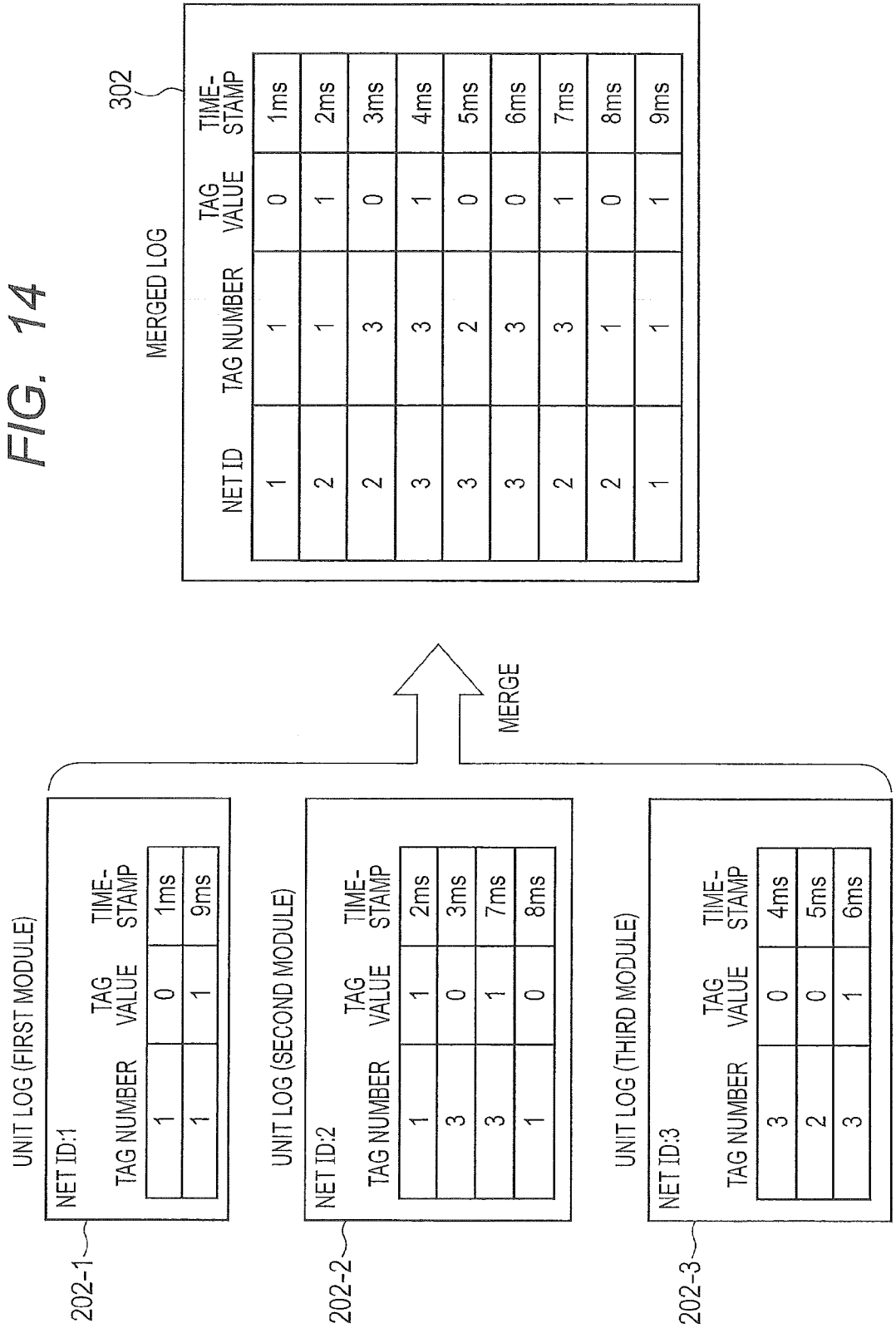
FIG. 14 is a diagram illustrating a process of merging unit logs.

The log analyzer 301 rearranges the contents of the unit log set 202 obtained from the actual product system 201 and converts the unit log set 202 to a merged log 302. FIG. 14 illustrates a merging process. Timestamps are recorded on the unit logs (202-1, 202-2, 202-3) of the individual modules. The log analyzer 301 rearranges data at each test point so that the data are aligned chronologically in accordance with the timestamps.

Next, the log analyzer 301 references the tag table 105 of the merged log 302 and converts the tag information (the net ID, the tag number, and the tag value) into an arbitrary form. FIG. 15 illustrates the result of table referencing.

Figure 16:
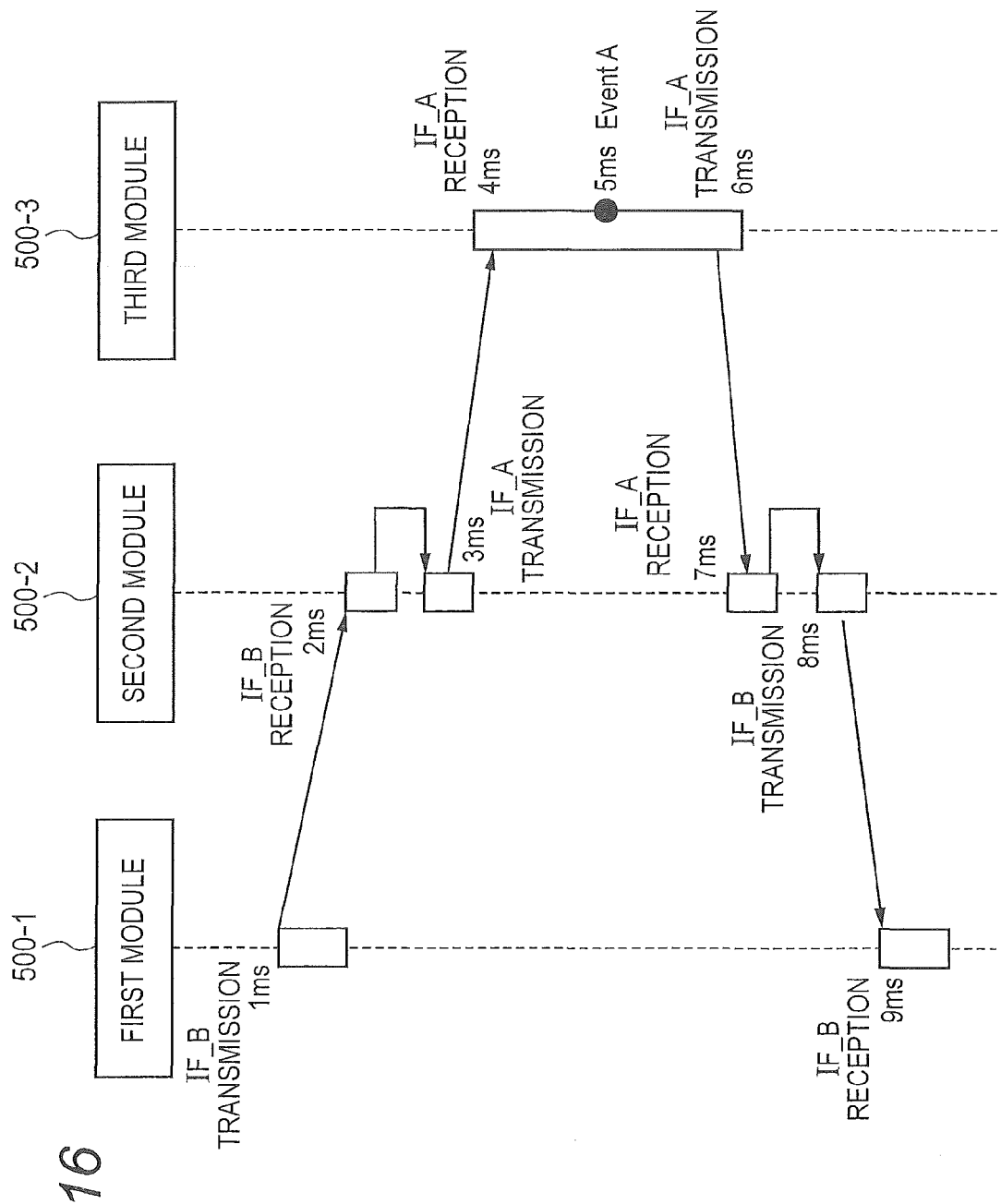
FIG. 16 is a sequence diagram illustrating the system log according to the first embodiment.

Finally, the system specifications 101 and the system log 303 are compared for software verification 307. FIG. 16 illustrates an example in which software operations are visualized from the system log. The example in FIG. 16 indicates how a command is transmitted from the first module 500-1 to the third module 500-3 and how a response is returned from the third module 500-3 to the first module 500-1. As is obvious from FIG. 16, the operations of the software running in the modules 500 can be verified while maintaining temporal consistency.

In the first embodiment, the system log 303 is used to visualize software operations. However, the use of the system log 303 is not limited to visualization. The system log 303 is also applicable to automatic agreement verification of a model based on the system specifications 101, which is depicted, for instance, in FIGS. 6, 7, and 8, and the system log 303, and to comparison between a simulation result and the system log 303.

The first embodiment has been described on the assumption that three modules are used. In reality, however, a larger number of modules are daisy-chained. The daisy-chained modules are subjected to the time synchronization process according to the first embodiment. Further, any network (a later-described star-coupled network or mesh-coupled network) may be formed by the modules included in the system as far as the system includes at least three daisy-chained modules.

The first embodiment provides the following operational advantages.

(1) In the first embodiment, the synchronization timers 404 are introduced so that all modules can gain access at a common time. When a method described in Japanese Unexamined Patent Publication No. 2012-190197 is used, the log of an event originated from a sub-CPU cannot be acquired because logs are merged with reference to time at which the sub-CPU is kicked by the main CPU. However, the first embodiment uses the synchronization timers, which are clocks indicative of a common time. Therefore, the first embodiment makes it possible to acquire the logs without being affected by the configuration of the system or of the network. The method described in Japanese Unexamined Patent Publication No. 2012-190197 permits the use of a star network only because the relationship between the main CPU and sub-CPUs is essential. However, the first embodiment permits the use of a tree network and a mesh network.

(2) In the first embodiment, a timestamp can be added at the same time the tag information is acquired. In the systems proposed in Japanese Unexamined Patent Publications No. 2010-204934 and No. Hei 09 (1997)-218800, timestamps are added by a debugging device coupled external to a module. Therefore, if logs are accumulated in the module or an interface with a significant delay is used for log output, time discrepancy occurs with respect to event occurrence. In the first embodiment, however, a timestamp indicative of the time of a synchronization timer in a module is added at the same time the tag information is acquired. Therefore, no time discrepancy occurs even if logs are accumulated in the module. Consequently, the following uses are made possible:

(a) An interface with a significant delay can be used for log acquisition.
(b) Even when the modules are dispersively installed at remote places, logs can be output and accumulated.
(c) Logs can be internally accumulated while an application is running and transferred to the outside after the application stops running. Therefore, the influence of log acquisition on the running of the application is minimized.
(d) Logs can be accumulated in the modules. Therefore, software can be analyzed as far as an inter-module interface can perform the time synchronization process. The network requirements of the system, such as the required speed of inter-module communication, can be relaxed.

(3) In the first embodiment, the synchronization timers are corrected during the time synchronization process. The method described in Japanese Unexamined Patent Publication No. 2012-190197 does not perform a time synchronization process. Therefore, if a sub-CPU operates for a long period of time even in a situation where an event is originated from the main CPU or if the main CPU and the sub-CPU communicate with each other at high speed, logging time discrepancy occurs. Further, when the method described in Japanese Unexamined Patent Publication No. 2012-190197 is used, state transitions and other high-speed software operations cannot possibly be analyzed without performing the time synchronization process.

In the first embodiment, time synchronization is accurately achieved by performing the time synchronization process. Therefore, the first embodiment is applicable to high-speed software operations and long-term module operations. Further, even when the modules use different clock oscillators, the modules can be synchronized by performing the time synchronization process. Therefore, the first embodiment makes it possible to analyze modules that are physically arranged apart from each other.

(4) In the first embodiment, logs output dispersively from the individual modules are merged by the log analyzer 301 to generate the system log. As the logs are analyzed by the log analyzer, the actual product system does not need to analyze or merge the logs. Consequently, analysis can be made without affecting the application process of the actual product system.

<<Second Embodiment>>

Figure 17:
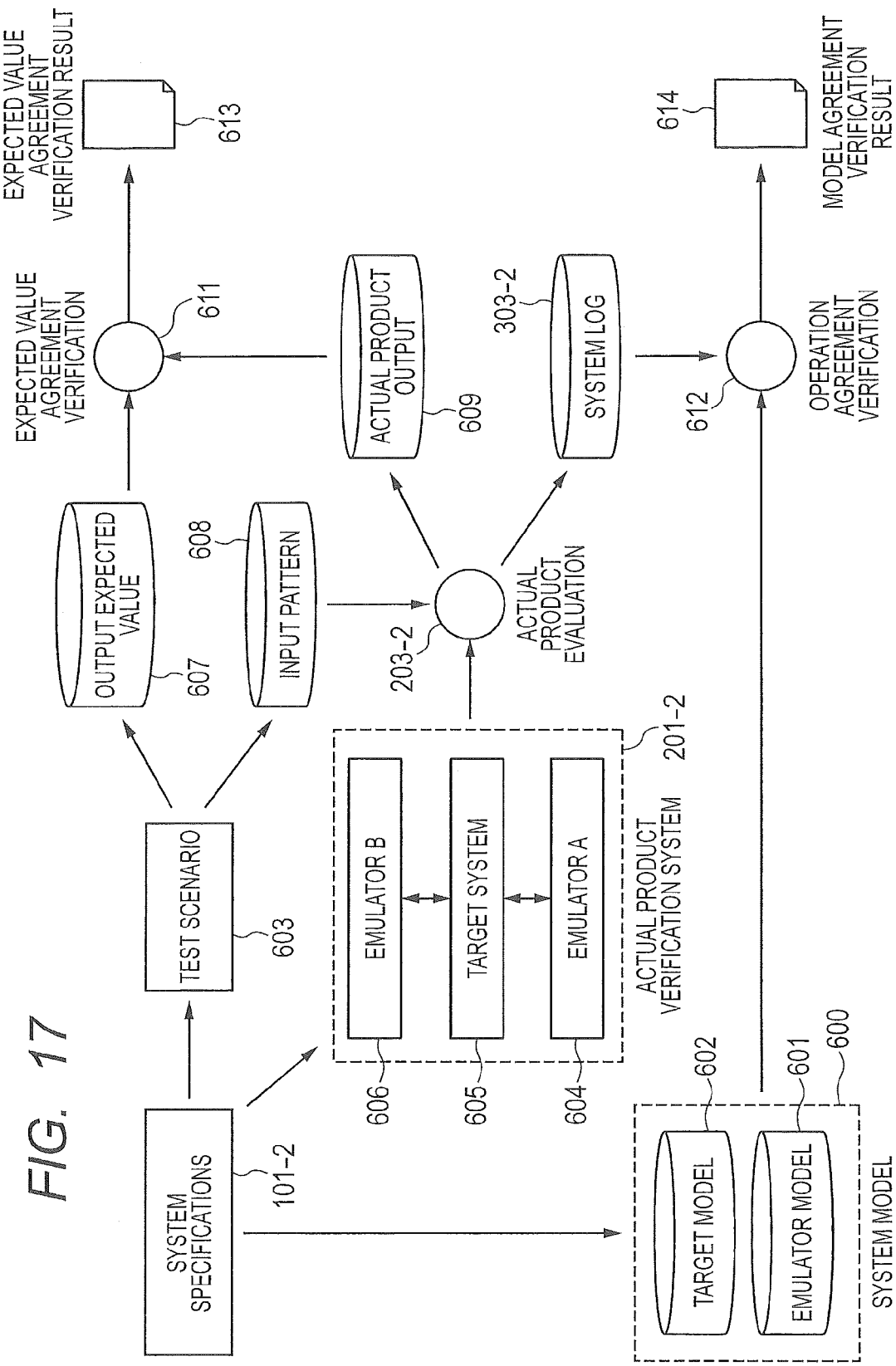
FIG. 17 is a system configuration diagram illustrating a system evaluation environment according to a second embodiment of the present invention.

A second embodiment of the present invention additionally uses emulators or other verification devices for software analysis in order to enhance the accuracy of verification. The second embodiment will be described with reference to a case where the method described in conjunction with the first embodiment is applied to a system verification environment (system development environment). A verification procedure is depicted in FIG. 17. The verification procedure is performed to conduct an actual product evaluation 203-2 of an actual product verification system 201-2 and conduct an expected-value agreement verification 611 and an operation agreement verification 612.

The actual product verification system 201-2 is an actual product evaluation environment for verifying the operation of a target system 605 defined by system specifications 101-2. The actual product verification system 201-2 includes the target system 605, emulator A 604, and emulator B 606. The emulators emulate a device coupled to the target system 605. Although details are given later, it is assumed here that the target system 605, emulator A 604, and emulator B 606 correspond to the modules according to the first embodiment. It is also assumed that the target system 605, emulator A 604, and emulator B 606 output a system log 303-2 as an operation log when software analysis is made in accordance with the first embodiment.

The expected-value agreement verification 611 is a verification in which the output of the target system 605 is compared against an expected value (subjected to black-box testing). In the expected-value agreement verification 611, a test scenario 603, which describes a verification procedure, is created from the system specifications 101-2, and an input pattern 608 and an output expected value 607 are generated from the test scenario 603. The input pattern 608 is used for testing. The output expected value 607 represents an expected value that prevails when a test is normally ended. The input pattern 608 is used to conduct the actual product evaluation 203-2 of the actual product verification system 201-2 and obtain an actual product output 609. The expected-value agreement verification 611 is performed on the actual product output 609 and the output expected value 607 to verify whether the target system 605 is operating normally.

In the operation agreement verification 612, a system model 600 of the target system 605 is compared against the system log 303-2 to verify the internal operation of the software (conduct white-box testing).

The system model 600 is data descriptive of software operations and formed of a target model 602 and an emulator model 601. The target model 602 is descriptive of the operations of the target system 605. The emulator model 601 is descriptive of the operations of an externally coupled device.

The system log 303-2 records the operations of the target system 605, emulator A 604, and emulator B 606 as depicted in FIG. 17. The recorded information is compared against the system model 600 to verify whether the target system 605 agrees with the system specifications 101-2.

Figure 18:
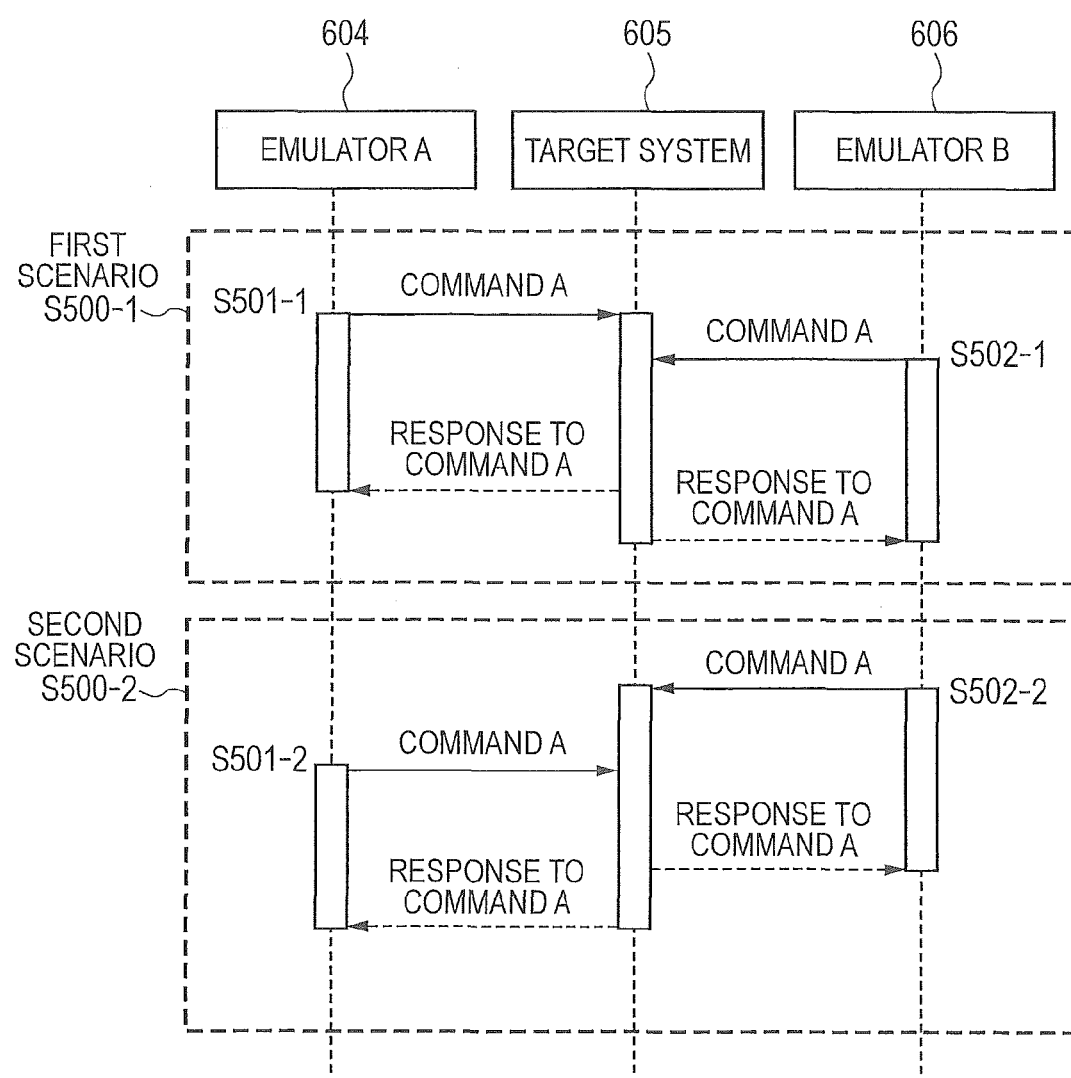
FIG. 18 is a sequence diagram illustrating an operation performed to generate the system log according the second embodiment.

FIG. 18 illustrates a sequence in which emulator A 604 and emulator B 606 issue command A to the target system 605. It is assumed in this instance that a first scenario S500-1 and a second scenario S500-2 are equal to each other in input/output and different only in the timing of command issuance. In the first scenario S500-1, emulator A 604 issues command A (S501-1) earlier than emulator B 606. In the second scenario S500-2, emulator B 606 issues command A (S502-2) earlier than emulator A 604.

When the expected-value agreement verification 611 is performed in a related-art manner, only the inputs/outputs of the first scenario S500-1 and the second scenario S500-2 are compared. Therefore, the difference between the first scenario S500-1 and the second scenario S500-2, which are equal in input/output and different in operation, cannot be verified. When the system log 303-2 is acquired and the relationship between the operations of the target system 605, emulator A 604, and emulator B 606 is acquired, differently timed test scenarios can be evaluated.

The second embodiment provides the following operational advantages.

When a related-art method is used, only the expected-value agreement verification 611 can be performed. However, when the system log 303-2 of the target system 605, emulator A 604, and emulator B 606 is acquired in accordance with the second embodiment, the operation agreement verification 612 can be performed. As described with reference to FIG. 18, the operation agreement verification 612 makes it possible to conduct a timing-dependent event evaluation.

<<Third Embodiment>>

Figure 19:
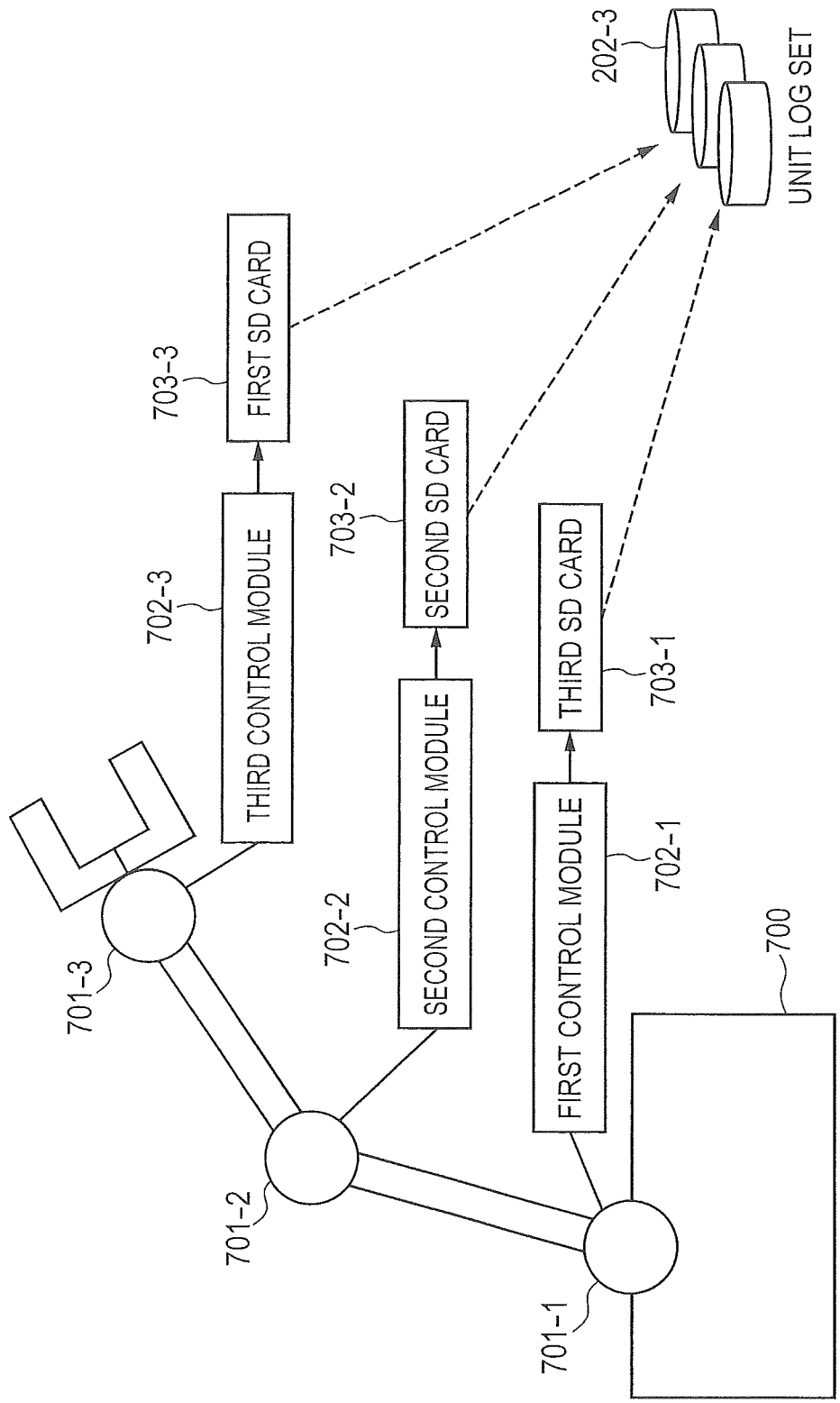
FIG. 19 is a block diagram illustrating the overall configuration of a third embodiment of the present invention.

A third embodiment of the present invention will now be described with reference to a method of acquiring a unit log set 202-3 by using an SD card or other portable storage medium. FIG. 19 illustrates the configuration of the third embodiment.

FIG. 19 illustrates a case where the third embodiment is applied to the evaluation of a robot arm 700. A first control module 702-1, a second control module 702-2, and a third control module 702-3, which provide motor control, are respectively incorporated into movable sections 701-1, 701-2, 701-3 of the robot arm 700. The individual control modules 702-1, 702-2, 702-3 are subjected to software analysis according to the first embodiment, and resulting unit logs are stored in a first SD card 703-1, a second SD card 703-2, and a third SD card 703-3, respectively. After the evaluation of the robot arm 700 is ended, a developer removes the SD cards 703-1, 703-2, 703-3 and reads data with a personal computer or the like to obtain the unit log set 202-3.

In the systems proposed in Japanese Unexamined Patent Publications No. 2010-204934 and No. Hei 09 (1997)-218800, a test device needs to be coupled external to a module. Such a test device is readily applicable to a target that does not move during evaluation. However, such a test device cannot be readily applied to a robot, an automobile, or other target that moves during evaluation due, for instance, to an installation space and the influence of the test device on motion.

As described thus far, the timestamp is added at the same time the log information is acquired. Therefore, logs dispersively output from the individual modules can be merged and accumulated. This feature makes it possible to temporarily store the logs in an SD card or other small-size, portable storage medium. The use of a small-size storage medium does not significantly affect the installation space or the motion of the robot arm. Therefore, the third embodiment is readily applicable to a situation where such limitations are imposed.

Further, as the storage medium can be removed and subsequently used to analyze a unit log, the third embodiment remains unaffected by the speed of communication between the modules. Consequently, the third embodiment is effective even in a situation where the speed of inter-module communication is low so that the communication for log collection takes an undue amount of time.

<<Fourth Embodiment>>

Figure 21:
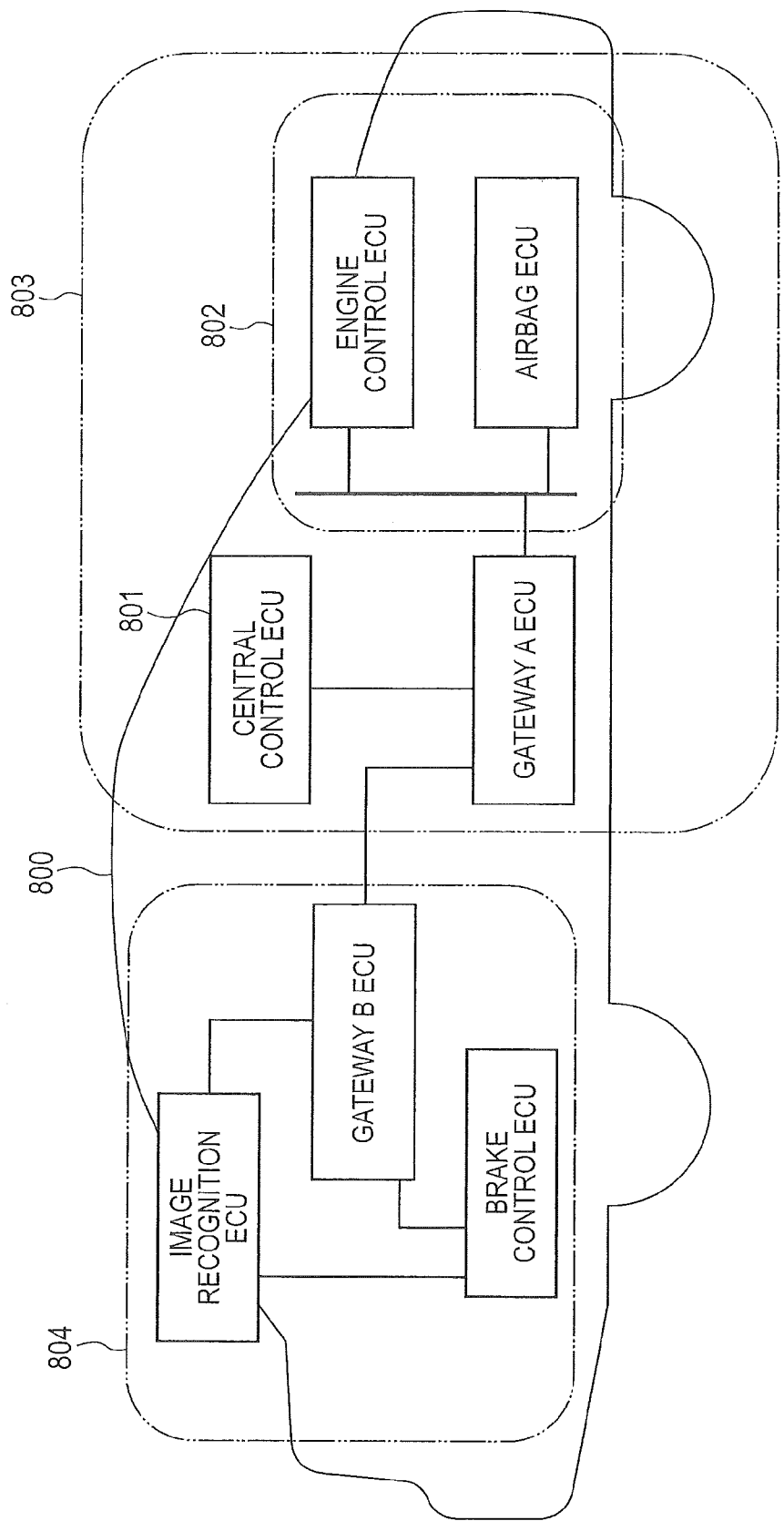
FIG. 21 is a system configuration diagram illustrating an application example in which the present invention is applied to a system in which a large number of modules are configured to form a network within, for instance, an automobile.

A fourth embodiment of the present invention will now be described. FIG. 21 illustrates a case where the fourth embodiment is applied to a system in which a large number of modules are coupled to a network within, for instance, an automobile. The first embodiment has been described with reference to a case where a one-to-one daisy-chain coupling scheme is employed. The fourth embodiment will be described with reference to a case where a network is formed. In the example depicted in FIG. 21, a large number of ECUs (electronic control units), which control an automobile 800, are network-coupled. The time synchronization process is performed so that all modules are synchronized with a central control ECU 801. In this instance, the type of network is not limited to a one-to-one coupling type or a daily-chain coupling type. The fourth embodiment can be applied to any type of network, including a bus coupled network 802, a tree network 803, and a mesh network 804.

While the embodiments of the present invention have been described, the present invention is not limited to the specific embodiments described above. It is to be understood that many variations and modifications of the present invention may be made without departing from the spirit and scope of the present invention.

For example, it has been assumed that the unit source described with reference to FIG. 2 is obtained by combining an application function with time synchronization, tag management, and tag insertion functions for system verification, and operated as depicted in FIG. 20. However, a system evaluation function based on the unit source set may be used not only for the evaluation of the actual product system at a development stage, but also for failure detection. In such an instance, the time synchronization, tag management, and tag insertion functions may be disabled during an actual operation. For example, the time synchronization, tag management, and tag insertion functions may be enabled only when an evaluation mode is selected for the system.

Further, the time synchronization process has been described with reference to a case where time settings of the synchronization timers are actually corrected. However, the time synchronization process is not limited to such a case. For example, an alternative is to retain the synchronization timer difference (time difference) Tdiff and count error Tcd, which are derived from communication delay measurement, as data, correct the synchronization timer time acquired at a tag point with the difference (time difference) Tdiff and count error Tcd, and form the timestamp by using the corrected time information.

Furthermore, the logs may be analyzed by using the CPU of one module.

Moreover, the functional configuration of a microcomputer or a data processing device, which is used in the form of the SOC or the like, is not limited to that depicted in FIG. 4, but may be changed as appropriate.

What is claimed is:

1. A data processing system, comprising:
   a plurality of control modules capable of communicating with each other to perform a cooperative data processing,
   wherein the control modules each include first and second communication interfaces and a timer, and performs a required application process of said cooperative data processing, a unit log generation process, and a time synchronization process in accordance with a program executed by the control modules, the time synchronization process being performed by the timer for time synchronization purposes specifically for said cooperative data processing performed by said plurality of control modules,
   wherein the control modules are coupled in series such that a second communication interface of a preceding one of the control modules is connected to a first communication interface of a succeeding one of the control modules,
   wherein, at a test point designated by a program executed in the unit log generation process, the unit log generation process generates timestamps in accordance with log information and with time information derived from the timer, and accumulates the timestamps together with attribute information about the test point to generate a unit log,
   wherein the time synchronization process synchronizes an overall time for the cooperative data processing by synchronizing the time information derived from the timer in a low-level control module with the time information derived from the timer in a high-level control module, and
   wherein the time synchronization process is a process in which the low-level control module receives information about the timer time of the high-level control module from the high-level control module and corrects its local timer time in accordance with the received information about the time and with the information about its local timer time and other information prevailing when the information about the time is received.

2. The data processing system according to claim 1, wherein the process of correcting the local timer time is a process of rewriting the local timer time.

3. The data processing system according to claim 1, wherein the process of correcting the local timer time is a process of correcting time information derived from the local timer at the time of timestamp generation.

4. The data processing system according to claim 1, wherein a communication delay in a communication from the high-level control module to the low-level control module is acquired, then a timer time error is computed by subtracting the communication delay from the difference between actual transmission time and reception time, and the computed timer time error is used to correct the timer time.

5. The data processing system according to claim 1, wherein external interface circuits exercise control to acquire time information from the local timer upon receipt of a first command, output a second command together with timer time information prevailing at the time of the output of the first command, exercise control to acquire the local timer time information at the time of the output of a third command, and output a fourth command together with the local timer time information prevailing upon receipt of the third command.

6. The data processing system according to claim 5, wherein the low-level control module acquires first time information from the local timer upon receipt of the first command from the high-level control module, acquires second time information about a high-level timer that prevails when the high-level control module outputs the first command together with the second command, acquires third time information about the local timer when the third command is output to the high-level control module, acquires fourth time information about the high-level timer that prevails upon receipt of the third command, the third command being output together with the fourth command by the high-level control module upon receipt of the third command, computes time that is half the sum of the difference between the fourth time information and the first time information and the difference between the third time information and the second time information, acquires the computed time as the communication delay in the communication from the high-level control module to the low-level control module, computes the timer time error by subtracting the communication delay from the difference between the actual transmission time and reception time, and corrects the timer time by using the computed timer time error.

7. The data processing system according to claim 6, wherein the external interface circuits each include a synchronization control circuit that acquires first time information from the local timer upon receipt of the first command, acquires second time information supplied together with the second command, acquires third time information about the local timer when the third command is output, and acquires fourth time information supplied together with the fourth command.

8. The data processing system according to claim 7, wherein the central processing unit computes the communication delay and the time error by using the first to fourth time information acquired by the external interface circuits.

9. The data processing system according to claim 8, wherein the central processing unit measures the communication delay before the start of an application process and controls a process of initially correcting the timer time by using the measured communication delay.

10. The data processing system according to claim 9, wherein, after the initial timer time correction, the central processing unit controls a process of correcting timer time with the measured communication delay in accordance with a timer interrupt generated at predetermined intervals.

11. The data processing system according to claim 1, wherein the attribute information about the test point includes first identification information allocated to a control module, second identification information indicative of the location of the test point within a program executed by the control module, and third identification information indicative of a process performed at the test point.

12. The data processing system according to claim 1, further comprising
a log analysis circuit,
wherein the log analysis circuit collects unit logs generated for the control modules, consolidates the unit logs by merging test point attribute information, log information, and timestamps by using timestamps included in the collected unit logs as an index, and generates a system log.

13. The data processing system according to claim 1, wherein the control modules are configured as in-vehicle ECUs coupled to an in-vehicle network.

14. The data processing system according to claim 1, wherein the control modules are configured as an actual product, which is to be emulated, or as emulators, which emulate the actual product.

15. A data processing system, comprising:
a plurality of control modules that operate while communicating with each other in performing a cooperative data processing; and
a log analysis circuit that collects logs acquired by a log acquisition function of the individual control modules, merges information about the collected logs in accordance with timestamps, and generates a system log of software running in the entire data processing system,
wherein the control modules each include first and second communication interfaces and the control modules are coupled in series such that a second communication interface of a preceding one of the control modules is connected to a first communication interface of a succeeding one of the control modules,
wherein the control modules each include a timer that counts time common to the entire data processing system implementing said cooperative data processing,
wherein a time synchronization process is performed for cooperative data processing between the control modules so that time information derived from a timer in a low-level control module is synchronized with time information derived from a timer in a high-level control module, and
wherein the control modules perform a log acquisition process during an application process to acquire a log and add a timestamp based on timer time to the acquired log.

16. A data processing system, comprising:
a plurality of control modules capable of communicating with each other,
wherein the control modules each include first and second communication interfaces and a timer, and perform a required application process, a unit log generation process, and a time synchronization process in accordance with a program executed by the control modules, the time synchronization process being performed by the timer for time synchronization purposes,
wherein the control modules are coupled in series such that a second communication interface of a preceding one of the control modules is connected to a first communication interface of a succeeding one of the control modules,
wherein, at a test point designated by a program executed in the unit log generation process, the unit log generation process generates timestamps in accordance with log information and with time information derived from the timer, and accumulates the timestamps together with attribute information about the test point to generate a unit log, and
wherein the time synchronization process synchronizes the time information derived from the timer in a low-level control module with the time information derived from the timer in high-level control module,
wherein an external interface circuit of a first control module acquires time information from its local timer upon receipt of a first command from a second control module, receives from the second control module a second command together with timer time information of the second control module prevailing at a time that the second control module output the first command, acquires its local timer time information at a time of outputting of a third command to toe second control module, and receives a fourth command from the second control module together with timer time information of the second control module prevailing at a time the second control module received the third command.

17. The data processing system according to claim 16, wherein the first control module comprises a low-level control module and the second control module comprises a high-level control module, such that the low-level control module acquires first time information from its local timer upon receipt of the first command from the high-level control module, acquires second time information about the high-level timer that prevails when the high-level control module outputted the first command together with the second command, acquires third time information from its local timer when the third command is outputted to the high-level control module, acquires fourth time information about the high-level timer that prevailed upon receipt of the third command, the fourth time information being output together with the fourth command by the high-level control module upon receipt of the third command, computes time that is half the sum of the difference between the fourth time information and the first time information and the difference between the third time information and the second time information, acquires the computed time as the communication delay in the communication from the high-level control module to the low-level control module, computes the timer time error by subtracting the communication delay from the difference between the actual transmission time and reception time, and corrects the timer time by using the computed timer time error.

18. A data processing system, comprising:
a plurality of control modules, each control module comprising:
a timer:
a central processing unit (CPU);
a first communication interface; and
a second communication interface,
wherein the control modules are coupled in series in such a manner that a second communication interface of a preceding one of the control modules is connected to a first communication interface of a succeeding one of the control modules, wherein the CPU executes a required application process, a unit log generation process, and a time synchronization process in accordance with a program executed by the control module, the time synchronization process being performed by the timer for time synchronization purposes, wherein, at a test point designated by a program executed in the unit log generation process, the unit log generation process generates timestamps in accordance with log information and with time information derived from the timer, and accumulates the timestamps together with attribute information about the test point to generate a unit log, and wherein the time synchronization process receives a first time information when the preceding one of the control modules transmits a first command, acquires a second time information from the timer when the first command is received through the first communication interface, and synchronizes the second time information with the first time information.

* * * * *